United States Patent
Magi

(10) Patent No.: US 9,317,155 B2
(45) Date of Patent: Apr. 19, 2016

(54) RUGGEDIZED WEARABLE ELECTRONIC DEVICE FOR WIRELESS COMMUNICATION

(71) Applicant: Intel Corporation, Santa Clara, CA (US)

(72) Inventor: Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 14/142,471

(22) Filed: Dec. 27, 2013

(65) Prior Publication Data

US 2015/0189056 A1 Jul. 2, 2015

(51) Int. Cl.

| | |
|---|---|
| H04M 1/00 | (2006.01) |
| H04W 4/00 | (2009.01) |
| G06F 3/041 | (2006.01) |
| G06F 3/044 | (2006.01) |
| H04M 1/60 | (2006.01) |
| H04W 68/00 | (2009.01) |
| G06F 3/0488 | (2013.01) |
| G06F 3/0484 | (2013.01) |
| G06F 3/0485 | (2013.01) |
| G06F 1/16 | (2006.01) |

(52) U.S. Cl.
CPC .............. *G06F 3/0414* (2013.01); *G06F 3/044* (2013.01); *G06F 3/0412* (2013.01); *G06F 3/0485* (2013.01); *G06F 3/0488* (2013.01); *G06F 3/04845* (2013.01); *H04M 1/6041* (2013.01); *H04W 68/00* (2013.01); *G06F 1/163* (2013.01); *G06F 2203/04102* (2013.01); *G06F 2203/04105* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| D42,449 | S | 4/1912 | Wittnauer |
| D255,022 | S | 5/1980 | Hofman |
| D267,218 | S | 12/1982 | Thompson |
| D373,509 | S | 9/1996 | Bormioli |
| D413,070 | S | 8/1999 | Charriol |
| D503,894 | S | 4/2005 | Tu |

(Continued)

FOREIGN PATENT DOCUMENTS

WO 2015/099957 7/2015

OTHER PUBLICATIONS

Mar. 16, 2015 International Search Report and Written Opinion in International Application No. PCT/US2014/067802, 11 pages.

(Continued)

*Primary Examiner* — Erika A Washington
(74) *Attorney, Agent, or Firm* — Patent Capital Group

(57) ABSTRACT

Particular embodiments described herein provide for a wearable electronic device, such as a bracelet, watch, wristband or armband that includes a circuit board coupled to a plurality of electronic components (which may include any type of components, elements, circuitry, etc.). One particular implementation of a wearable electronic device may include a strap portion and a display portion. The display portion may include a display; one or more input elements configured to receive one or more interactions that may be associated with: selecting a preconfigured message to communicate and selecting one or more other electronic devices to which to communicate a preconfigured message. The wearable electronic device may further include wireless communication circuitry configured to communicate a selected preconfigured message to one or more selected other electronic devices.

25 Claims, 16 Drawing Sheets

(56) References Cited

U.S. PATENT DOCUMENTS

| | | |
|---|---|---|
| D505,555 S | 5/2005 | Snell |
| D565,905 S | 4/2008 | Valderrama |
| D568,175 S | 5/2008 | Martinez |
| D613,737 S | 4/2010 | Ahlstrom |
| D616,790 S | 6/2010 | Mear |
| D644,201 S | 8/2011 | Park et al. |
| D660,367 S | 5/2012 | Podd |
| D689,701 S | 9/2013 | Mischel et al. |
| D699,448 S | 2/2014 | Yang et al. |
| D705,777 S | 5/2014 | Groene et al. |
| D709,876 S | 7/2014 | Aumiller et al. |
| D713,269 S | 9/2014 | Rapko |
| D713,404 S | 9/2014 | Green |
| D719,158 S | 12/2014 | Akana et al. |
| D728,561 S | 5/2015 | Park et al. |
| D729,233 S | 5/2015 | Lee et al. |
| D729,235 S | 5/2015 | Nagao et al. |
| D730,198 S | 5/2015 | Perko et al. |
| 2003/0206493 A1 | 11/2003 | Carrard |
| 2006/0274036 A1 | 12/2006 | Hioki et al. |
| 2009/0115735 A1 | 5/2009 | Chuang |
| 2010/0029327 A1 | 2/2010 | Jee |
| 2010/0219943 A1 | 9/2010 | Vanska et al. |
| 2011/0187681 A1 | 8/2011 | Kim et al. |
| 2012/0150327 A1* | 6/2012 | Altman et al. .............. 700/91 |
| 2012/0274585 A1 | 11/2012 | Telfer et al. |
| 2013/0044215 A1 | 2/2013 | Rothkopf et al. |
| 2013/0154970 A1 | 6/2013 | Seo et al. |
| 2013/0222270 A1 | 8/2013 | Winkler et al. |
| 2014/0057610 A1* | 2/2014 | Olincy et al. ............. 455/414.1 |
| 2014/0269224 A1* | 9/2014 | Huh et al. .................. 368/73 |
| 2014/0362544 A1* | 12/2014 | Han et al. .................. 361/749 |
| 2015/0026647 A1 | 1/2015 | Park et al. |
| 2015/0049657 A1* | 2/2015 | Cheng et al. .............. 370/311 |
| 2015/0185944 A1 | 7/2015 | Magi et al. |
| 2015/0188861 A1* | 7/2015 | Esplin et al. ............. H04L 51/06 |

OTHER PUBLICATIONS

"Adidas jumps into wearable computing, announces new $399 smartwatch at Mobilize," http://gigaom.com/2013/10/16/adidas-shows-off-new-smartwatch-that-provides-personal-coaching, printed Jan. 16, 2014, 5 pages.

"High tech meets high fashion," Los Angeles Times, http://articles.latimes.com/2013/may/26/image/la-ig-tech-fashion-20130526, printed Jan. 16, 2014, 3 pages.

"Bluetooth 4.0 finalized: low power mode & boosted range," SlashGear, http://www.slashgear.com/bluetooth-4-0-finalized-low-power-mode-boosted-range-2182619/, printed Mar. 30, 2015, 8 pages.

USPTO Jun. 30, 2015 Restriction Requirement in U.S. Appl. No. 29/477,895, 5 pages.

Mahmoud, "Wireless Application Programming with J2ME and Bluetooth", Oracle Technology Network—System Admins and Developers; http://www.oracle.com/technetwork/systems/index-156651.html (printed Jul. 28, 2015); Feb. 2003.

Wikipedia, "Scatternet", https://en.wikipedia.org/wiki/Scatternet[Jul. 28, 2015]; printed Jul. 28, 2015.

Wikipedia, "Pressure sensor", https://en.wikipedia.org/wiki/Pressure_sensor[Jul. 28, 2015]; printed Jul. 28, 2015.

Wikipedia, "Piconet", https://en.wikipedia.org/wiki/Piconet[Jul. 28, 2015]; printed Jul. 28, 2015.

Wikipedia, "Global Positioning System", https://en.wikipedia.org/wiki/Global_Positioning_System[Jul. 28, 2015]; printed Jul. 28, 2015.

Wikipedia, "Flexible organic light-emitting diode", https://en.wikipedia.org/wiki/Flexible_organic_light_emitting_diode[Jul. 28, 2015]; printed Jul. 28, 2015.

Bluetooth, "Master Table Contents & Compliance Requirements", vol. 1, Part A and vol. 2, Parts A and B, Dec. 3, 2013.

USPTO Notice of Allowance in U.S. Appl. No. 29/447,901 mailed on Jul. 23, 2015.

USPTO Notice of Allowance in U.S. Appl. No. 29/477,895 mailed on Sep. 25, 2015.

Pottery Barn, Vanity Station. Jan. 7, 2015 [online]. [site visited Sep. 8, 2015]. Available from Internet, URL:http://www.potterybarn.com/products/campaign-over-door-bath-storage/?pkey=cbath-whats-new&bnrid=3317500&cm_ven=AfCmtyCont&cm$_{13}$cat=Skimlinks&cm_pla=CJ&cm+ite=Std. 3 pages.

HSN. Over-The-Door Jewelry Armoire with Full-Length Mirror. Jan. 2, 2011 [online], [site visited Sep. 8, 2015]. Available from internet, URL:http://www.hsn.com/products/over-the-door-jewelry-armoire-with-full-length-mirror/1793084. 4 pages.

Rakuten Global Market. Stand Mirror Hanger Rack Iron Series. Jan. 21, 2015 [online], [site visited Sep. 8, 2015]. Available from Internet, URL:http//global.rakuten.com/en/store/livingut/item/4582222657508/?s-id=borderless_recommend_item_en. 6 pages.

USPTO Non Final Office Action in U.S. Appl. No. 14/142,277 mailed on Oct. 5, 2015.

* cited by examiner

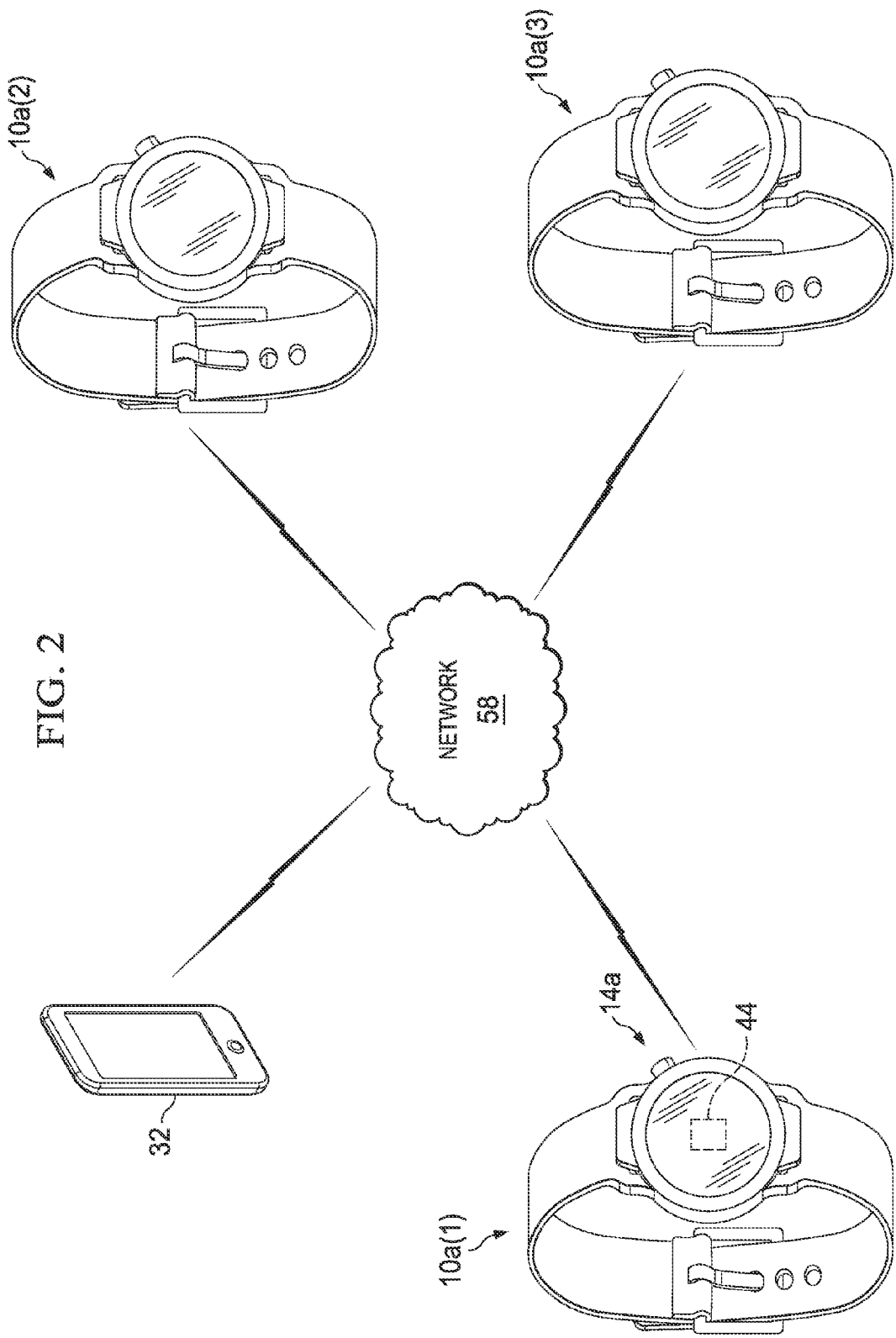

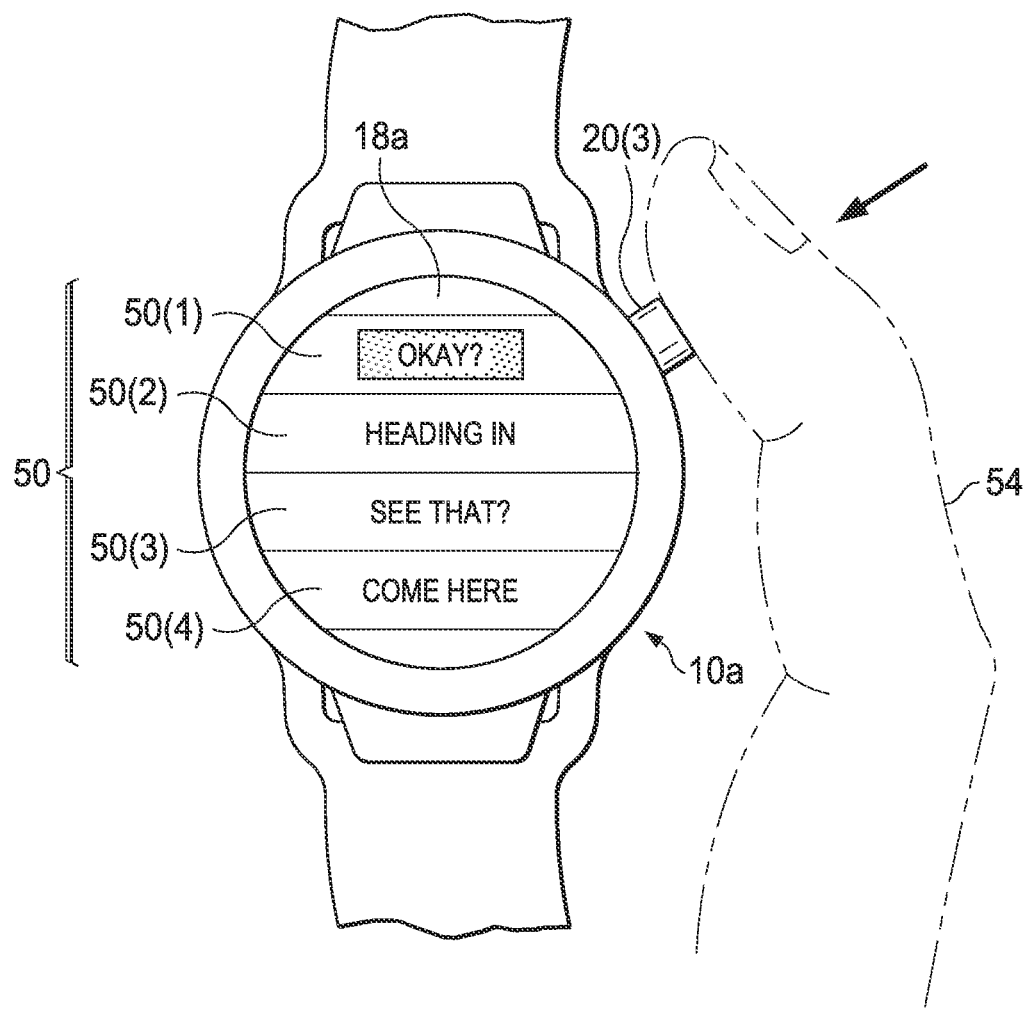

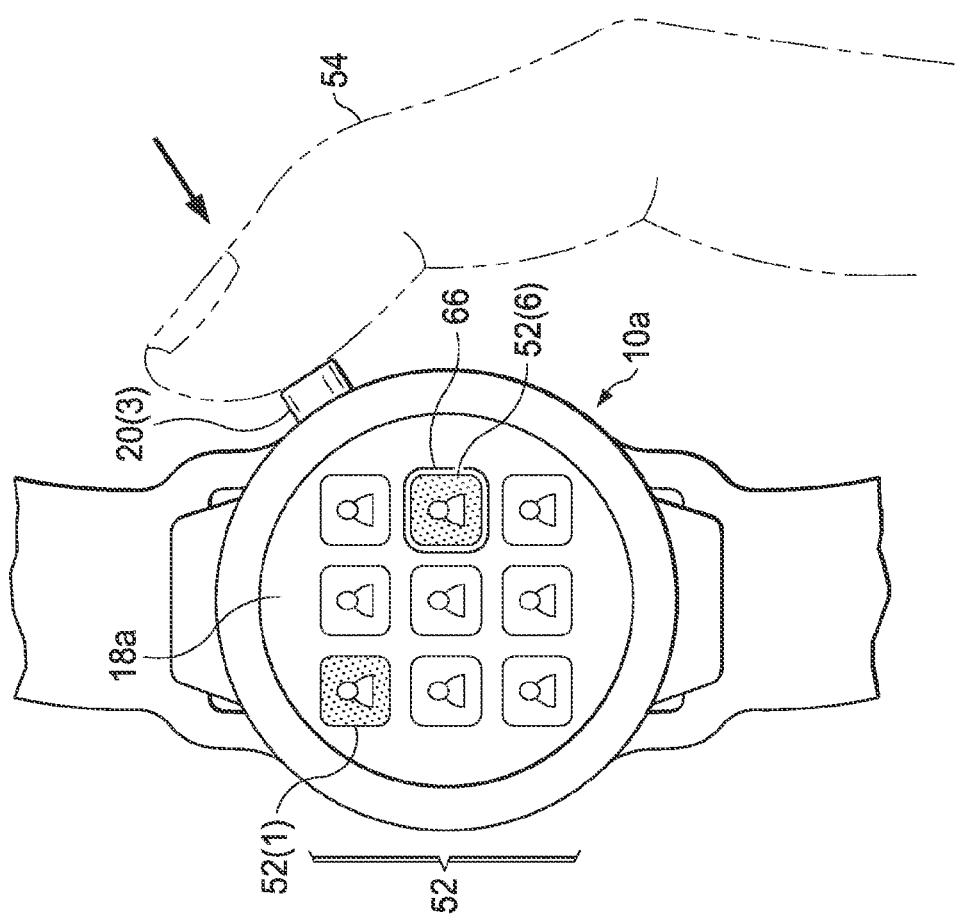
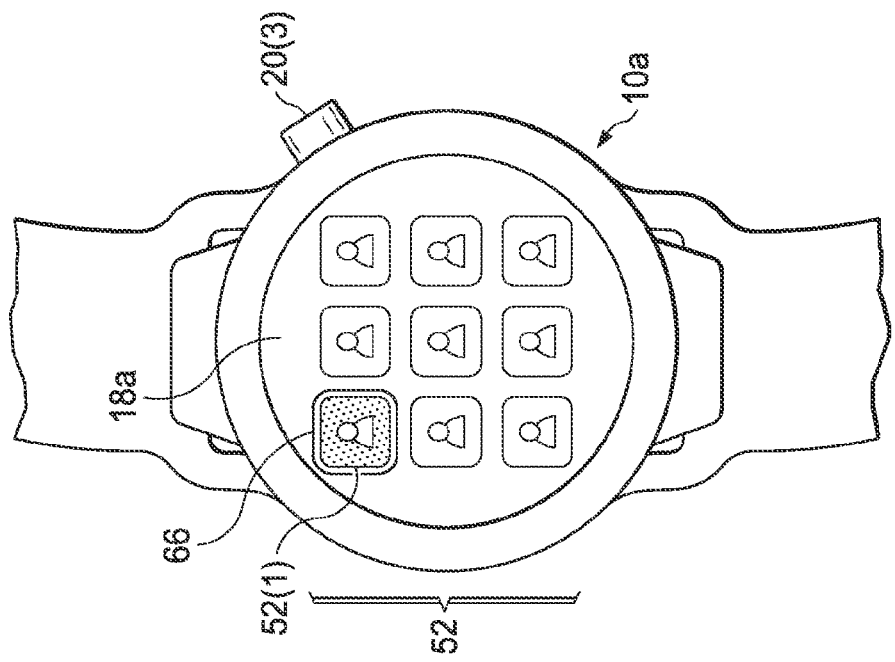

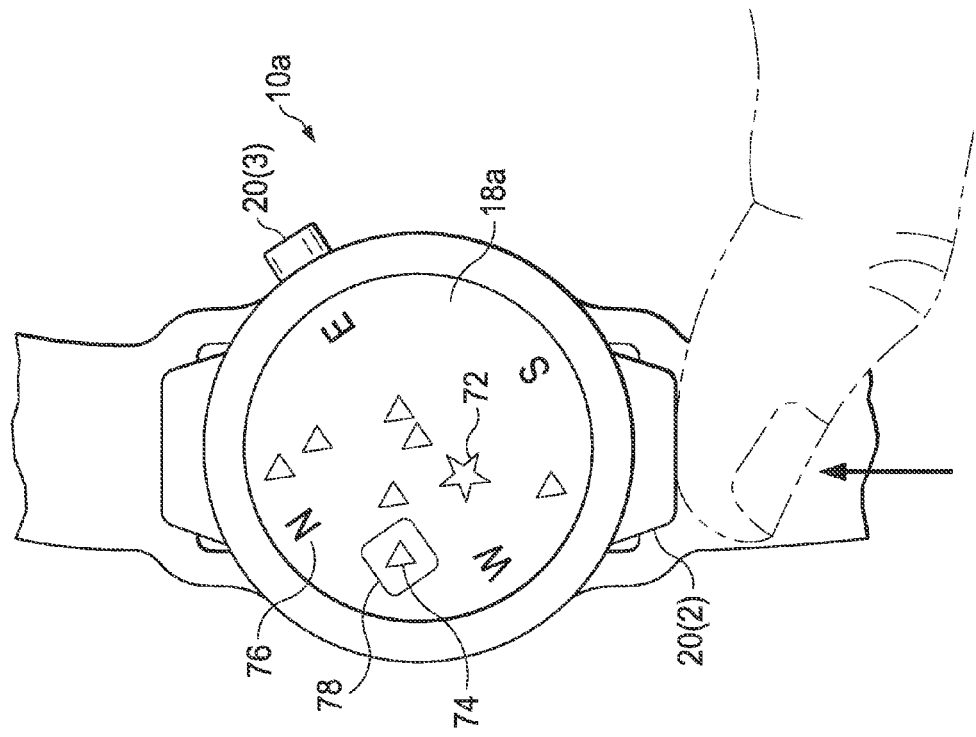
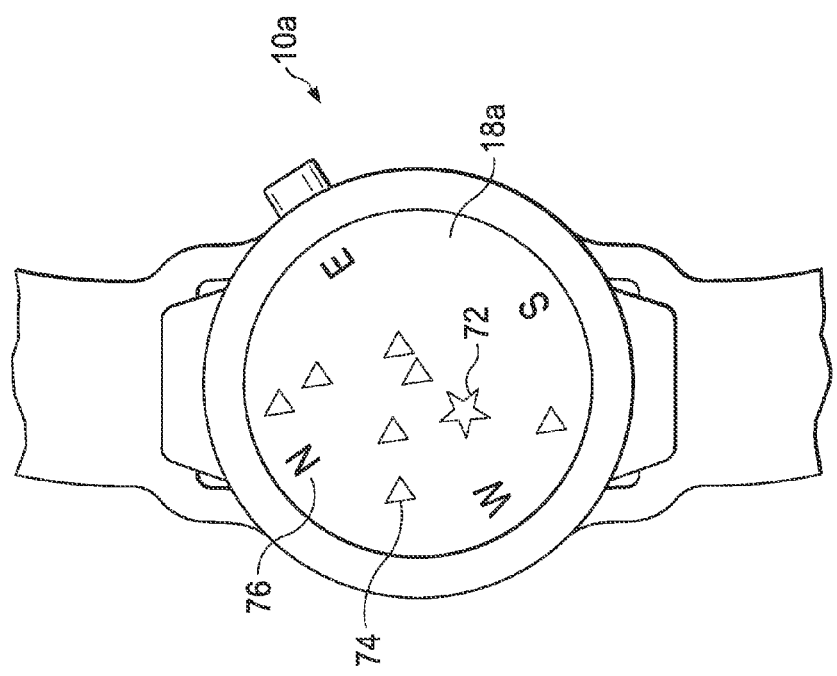

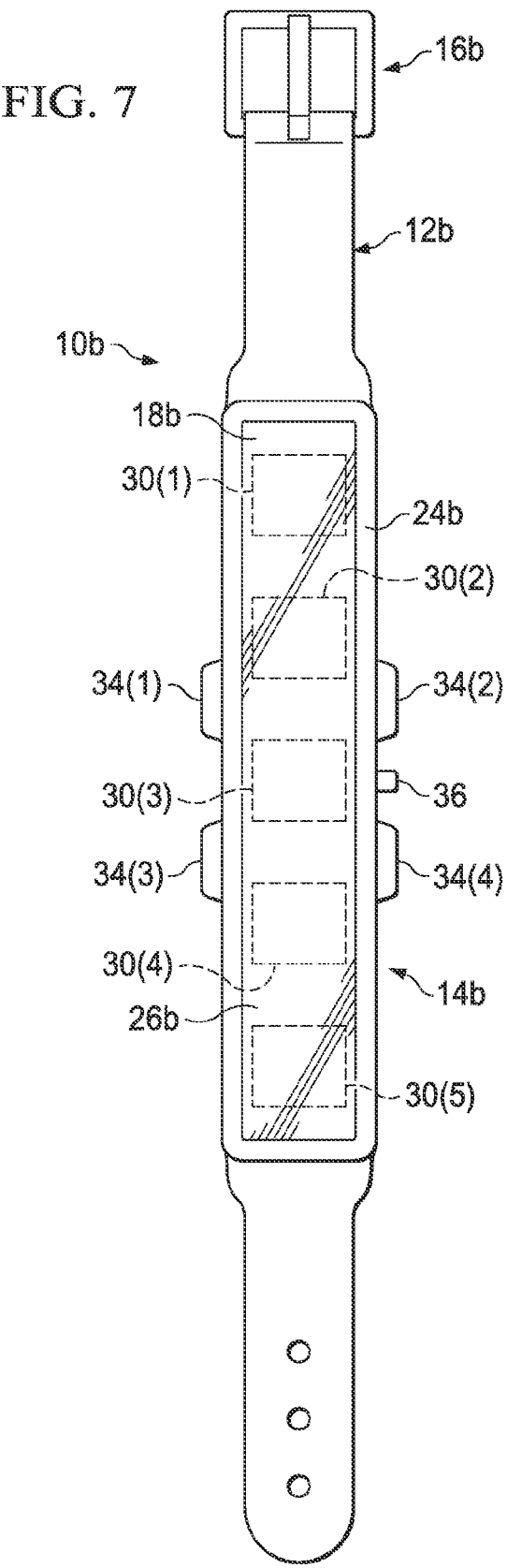

RUGGEDIZED WEARABLE ELECTRONIC DEVICE FOR WIRELESS COMMUNICATION

CROSS-REFERENCE TO RELATED APPLICATIONS

This Application is related to co-pending U.S. patent application Ser. No. 14/142,277, filed Dec. 27, 2013, entitled "Wearable Electronic Device Including a Flexible Interactive Display," Inventor(s) Aleksander Magi, et al., which Application is considered incorporated by reference into the disclosure of this Application.

TECHNICAL FIELD

Embodiments described herein generally relate to a ruggedized wearable electronic device for wireless communication.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends currently afoot is electronic devices that can be worn by users, sometimes referred to as wearable electronic devices. Wearable electronic devices can be worn on a user's wrist, arm, ankle, etc. Electronic devices such as mobile phones provide features for typing and sending messages; however, this often requires the user to tediously type messages using a small interactive keyboard on the mobile phone. Further, mobile phones cannot typically be operated under adverse environmental conditions where the phone may get wet. Thus, mobile phone users are limited to using their devices in dry conditions and when the user may have the ability to focus on a keyboard to type and send a message. Such limitations can prohibit the use of electronic devices during many activities, such as, for example, surfing, mountain climbing, skiing, hunting or any other activity where the device may get wet or that requires the user's attention to find letters on a keyboard for creating a message.

Although wearable electronic devices are quickly becoming a member of the technological ecosystem, interactions between device and user have yet to become streamlined and generally suffer from the same limitations as mobile phones for communicating messages and providing the ability to be operated under adverse conditions. Hence there is a need to streamline communication features for wearable electronic devices and, further, to provide features for wearable electronic devices, which will allow them to be operated under adverse conditions.

BRIEF DESCRIPTION OF THE DRAWINGS

Embodiments are illustrated by way of example and not by way of limitation in the FIGURES of the accompanying drawings, in which like references indicate similar elements and in which:

FIG. 2 is a simplified block diagram illustrating an embodiment of a wearable electronic device, in accordance with one embodiment of the present disclosure;

FIG. 3B is a simplified partial top view illustrating an embodiment of a wearable electronic device, in accordance with one embodiment of the present disclosure;

FIG. 3C is a simplified partial top view illustrating an embodiment of a wearable electronic device, in accordance with one embodiment of the present disclosure;

FIG. 3D is a simplified partial top view illustrating an embodiment of a wearable electronic device, in accordance with one embodiment of the present disclosure;

FIG. 6A is a simplified partial top view illustrating an embodiment of a wearable electronic device, in accordance with one embodiment of the present disclosure;

FIG. 6B is a simplified partial top view illustrating an embodiment of a wearable electronic device, in accordance with one embodiment of the present disclosure;

FIG. 7 is a simplified orthographic top view illustrating an embodiment of a wearable electronic device, in accordance with one embodiment of the present disclosure;

Figure 1A:
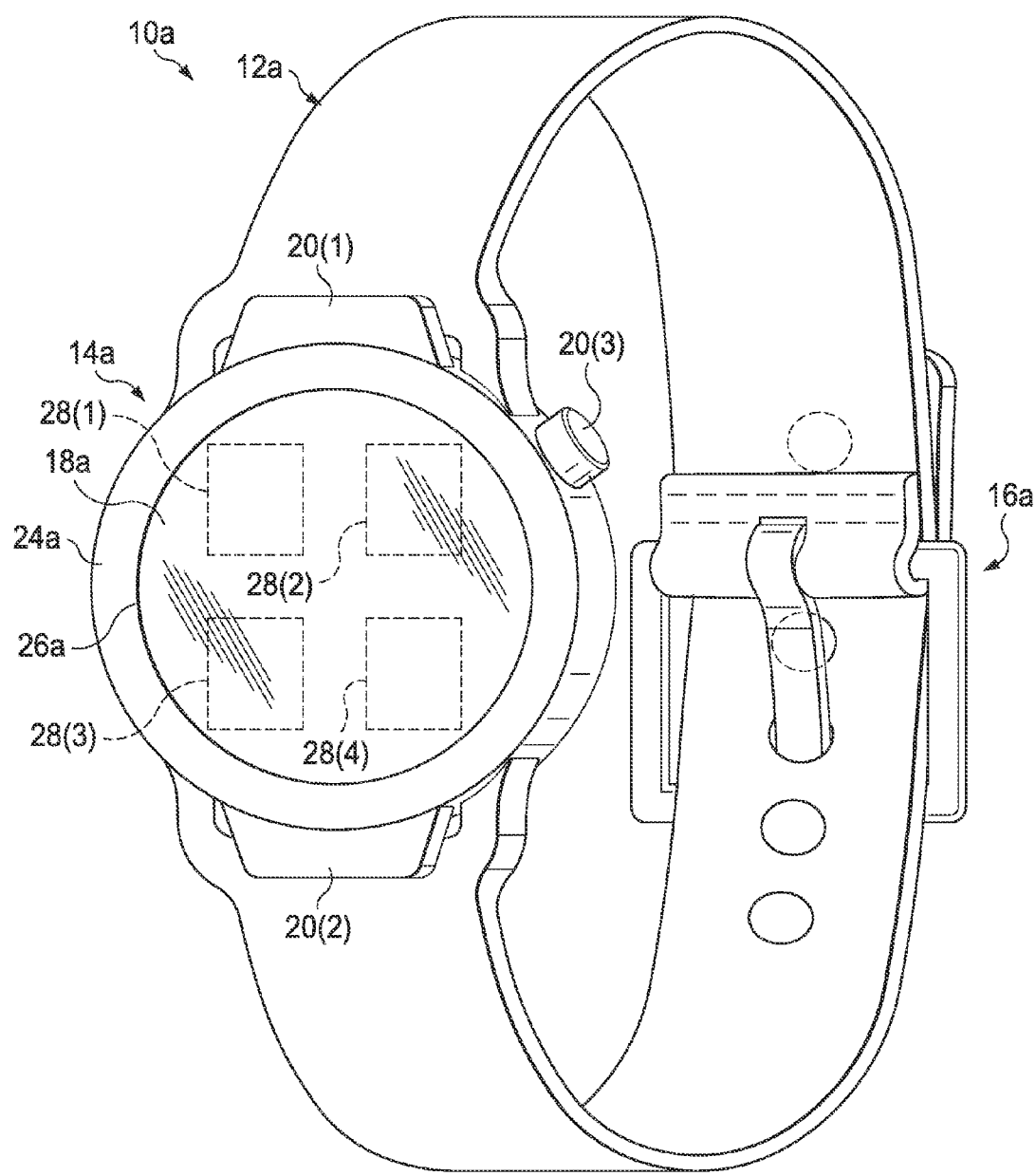
FIG. 1A is a simplified orthographic view illustrating an embodiment of a wearable electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include: a strap portion; and a display portion that may include: a display; one or more input elements configured to receive one or more interactions that may be associated with: selecting a preconfigured message to communicate and selecting one or more other electronic devices to which to communicate a preconfigured message; and wireless communication circuitry configured to communicate a selected preconfigured message to one or more selected other electronic devices.

Note, that in at least one embodiment one or more preconfigured messages can be configured by a user and stored in a memory in the wearable electronic device. Note also, that in at least one embodiment, a plurality of pressure sensors may be configured beneath the display to register one or more touch inputs made to the display. Note, additionally, that each of the plurality of pressure sensors may be arranged at a location beneath the display that corresponds to a layout of icons of a graphical user interface provided by the wearable electronic device. Note additionally, that in at least one embodiment, the wearable electronic device can further include a protective body with a protective screen that encapsulates the display portion and each of the one or more input elements, which, in one or more embodiments may provide water proofing for the display portion of the wearable electronic device and electronic components within the display portion.

In another example implementation, the wearable electronic device may include logic, at least a portion of which is partially implemented in hardware, the logic configured to: receive touch input data for one or more interactions registered by one or more input elements, wherein the touch input data may be associated: selecting a preconfigured message to communicate and selecting one or more other electronic devices to which to communicate a preconfigured message; determine, based on the touch input data, a selected preconfigured message and one or more selected other electronic devices to which to communicate the selected preconfigured message; communicate, using wireless communication circuitry, the selected preconfigured message to the one or more selected other electronic devices upon receiving touch input data corresponding to a simultaneous interaction with a pair of input elements; and display a default set of navigation icons on a display following the communication. Note, that in at least one embodiment, the logic may include at least one processor and at least one memory.

Example Embodiments

The following detailed description sets forth example embodiments of apparatuses, methods, and systems relating to configurations for a ruggedized wearable electronic device for wireless communication. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of a wearable electronic device 10a in accordance with one embodiment of the present disclosure. Wearable electronic device 10a can include a strap portion 12a, a display portion 14a and a latch portion 16a. Display portion 14a may include a display 18a, input elements 20(1)-(3) and pressure sensors 28(1)-(4), which may be configured beneath display 18a. A first input element 20(1) and a second input element 20(2) may be configured on opposing ends of display portion 14a and a third input element 20(3) may be configured near first input element 20(1).

In one or more embodiments, input elements 20(1)-(3) can be configured as multifunction buttons, switches, sliders, levers, soft-keys, toggle switches combinations thereof or the like. In one or more embodiments, input elements 20(1)-(3) and pressure sensors 28(1)-(4) may be configured to register touch inputs, which may provide a user with the ability to use (e.g., access, interact with, navigate, interface with, etc.) wearable electronic device 10a. Note, the number of input elements and pressure sensors illustrated in FIG. 1A is provided for illustrative purposes only; it should be understood that any number of fewer or more input elements are certainly encompassed by alternative embodiments of the present disclosure.

In one or more embodiments, display 18a may be a flexible display screen, which may be an organic light-emitting diode (OLED) display screen, or any other suitable display screen system, which may allow a user to use (e.g., access, interact with, navigate, interface with, etc.) features and applications of wearable electronic device 10a. In one or more embodiments, display 18a may be flexed in one or more direction in concert with movements of strap portion 12a. In one or more embodiments, display portion 14a may be disposed within/on and/or supported by strap portion 12a, may be coupled to strap portion 12a through one or more coupling links or may be a unibody constructed device integrated with a protective body.

Display portion 14a may include ruggedized features, such as a protective body 24a and a protective screen 26a, which may be integrated into the protective body 24a. Protective body 24a may surround and encapsulate display 18a and input elements 20(1)-(3). Protective body 24a and protective screen 26a may be configured to provide water proofing for electronics (e.g., processors, memory, batteries, display, etc.) of wearable electronic device 10a. In one or more embodiments, protective body 24a and protective screen 26a may provide water proofing for up to 200 m. In one or more embodiments, protective body 24a may be constructed of materials that may absorb shocks, knocks, falls, or other forms of impacting forces that may be encountered during use of wearable electronic device. In one or more embodiments, materials that can be used to construct protective body 24a may include plastic, rubber, injection molding, neoprene, carbon fiber, polymer, elastomer, silicone, polycarbonates, vinyl, polypropylene, polystyrene, polyethylene, combinations thereof or the like. In one or more embodiments, protective screen 26a may be constructed of similar materials provided in a transparent configuration, which may further protect display 18a from scratches, damage, etc. In one or more embodiments, protective screen 26a may be flexible to allow touch inputs to be made to display 18a. In one or more embodiments, display portion 14a may range in diameter/width from approximately 25 mm to approximately 65 mm.

In one or more embodiments, as configured in wearable electronic device 10a, pressure sensor 28(1)-(4) [a first pressure sensor 28(1), a second pressure sensor 28(2), a third pressure sensor 28(3) and a fourth pressure sensor 28(4)] may provide a mechanism to register touch inputs to display 18a in order to use (e.g., access, interact with, navigate, interface with, etc.) features and applications, which may be provided by wearable electronic device. Specifically, pressure sensors 28(1)-(4) may be configured as input elements to provide a means to interact with a graphical user interface (GUI), which may be provided by wearable electronic device 10a. GUIs are interfaces that enable users to use (e.g., access, interact with, navigate, interface with, etc.) features and applications of electronic devices (e.g., wearable electronic device 10a) using images. Recall display 18a may be a flexible display, thus, user inputs that may be provided to display 18a may easily be registered by any of pressure sensors 28(1)-(4) configured beneath display 18a to enable a user to use (e.g., access, interact with, navigate, interface with, etc.) features and applications, including the GUI, of wearable electronic device 10a.

In one or more embodiments, pressure sensors 28(1)-(4) may be arranged beneath display 18a in a quadrant layout; first pressure sensor 28(1) may be provided in an upper left quadrant, second pressure sensor 28(2) may be provided in an upper right quadrant, third pressure sensor 28(3) may be provided in a lower left quadrant and fourth pressure sensor 28(3) may be provided in a lower right quadrant beneath display 18a. The quadrant layout for pressure sensors may align with navigation icons for GUI, which may be provided by wearable electronic device 10a to enable a user to navigate applications and features of wearable electronic device 10a. Pressure sensors 28(1)-(4) may provide an effective means for accessing and interacting with features provided by wearable electronic device 10a in adverse environmental conditions.

For example, capacitive touchscreens often provide a means to interact with an electronic device using touch inputs, however, capacitive touchscreens have limited use when a user may be wearing gloves or other protective coverings over their hands/fingers. In another example, resistive touch screens do not suffer from the same limitations as capacitive touch screens, however, resistive touch screens are typically mounted on a glass substrate, which can limit their use in harsh environments where they may be jostled, bent or otherwise flexed. In one or more embodiments, pressure sensors, which can be configured as capacitive thin-film pressure sensors, can be implemented in a variety of environments, and, thus, may provide an efficient and robust means for accessing and interacting with features and applications that may be provided by wearable electronic device 10a.

In one or more embodiments, strap portion 12a may be made of one or more flexible materials including, but not limited to, polymers, plastics, rubbers, elastics, elastomers, neoprene, combinations thereof or the like. In one or more embodiments, strap portion 12a may be of a latch design (e.g., having two ends as shown in FIG. 1) or may be of a continuous design (e.g., having no ends). In various embodiments, strap portion 12a may range in length from approximately 5 inches to approximately 10 inches and may range in width from approximately 8 mm to approximately 65 mm in width. In more general terms, strap portion 12a can be constructed having varying overall lengths to accommodate securing wearable electronic device 10a to a variety of different users, which may have a range of different body proportions, etc. and/or a variety of different user body parts (e.g., wrists, arms, ankles, etc.) which may have a range of different corresponding sizes. The ornamental design and material construction of strap portion 12a can be adjusted in any manner to suit any designer, manufacturer and/or vendor without departing from the scope of the embodiments described in the present disclosure. In one or more embodiments, latch portion 16a can include one or more latching mechanisms such as buckle-type latches (as shown in FIG. 1), clasp-type latches, pressure-type latches, hook-type, ratchet-type latches, mechanical latches, combinations thereof or the like.

In one or more embodiments, electronics (e.g., processors, batteries, controllers, memory, logic, etc.) for wearable electronic device 10a may reside in display portion 14a. In one or more embodiments, wearable electronic device 10a may be configured to operate using a replaceable battery, or in some cases, may be configured to operate using a rechargeable battery, each of which may be housed in display portion 14a. In some embodiments, wearable electronic device may include charging contacts configured on either the outer or inner surface of strap portion 14a, which can be used in combination with a charging device to facilitate charging a rechargeable battery within wearable electronic device 10a. Virtually any means may be used to provide power and/or charging for wearable electronic device 10a, and, thus, are clearly within the scope of the present disclosure.

In one or more embodiments, wearable electronic device 10a can include wireless communication circuitry (e.g., Wi-Fi module, Bluetooth™ module, near field communication (NFC) module, any 802.11 protocol, or other wireless communication circuitry) to allow wearable electronic device 10a to communicate with one or more other electronic devices (wearable or not wearable) or a network through a wireless connection. The wireless connection may be any 3G/4G/LTE cellular wireless connection, WiFi/WiMAX connection, Bluetooth™ connection, or some other similar wireless connection. In one or more embodiments, the wireless communication circuitry can be configured to provide for two-way radio communications with another two-way radio capable device. In one or more embodiments, a user may configure two-way radio channel information into wearable electronic device 10a in order to communicate with other two-way radio devices. In an embodiment, a plurality of antennas can be provisioned in conjunction with wearable electronic device 10a, which may be associated with wireless connection activities. The antennas are reflective of electrical components that can convert electric currents into radio waves or radio signals.

Wearable electronic device 10a may include logic to determine a best mode of communication using various signal measurement techniques, including, but not limited to, wireless beacons (to locate one or more Wi-Fi networks), received signal strength indicator (RSSI), link quality indicator (LQI), measurement reports for one or more 3G/4G/LTE cellular wireless connections, combinations thereof or the like. In one or more embodiments, wearable electronic device may connect to an appropriate wireless network based on the signal measurements. In one or more embodiments, wearable electronic device 10a may contain a camera, a microphone, and/or a speaker, all of which may be encapsulated by protective body 24a and protective screen 26a to protect such devices from water, liquids, damage, etc.

Figure 1B:
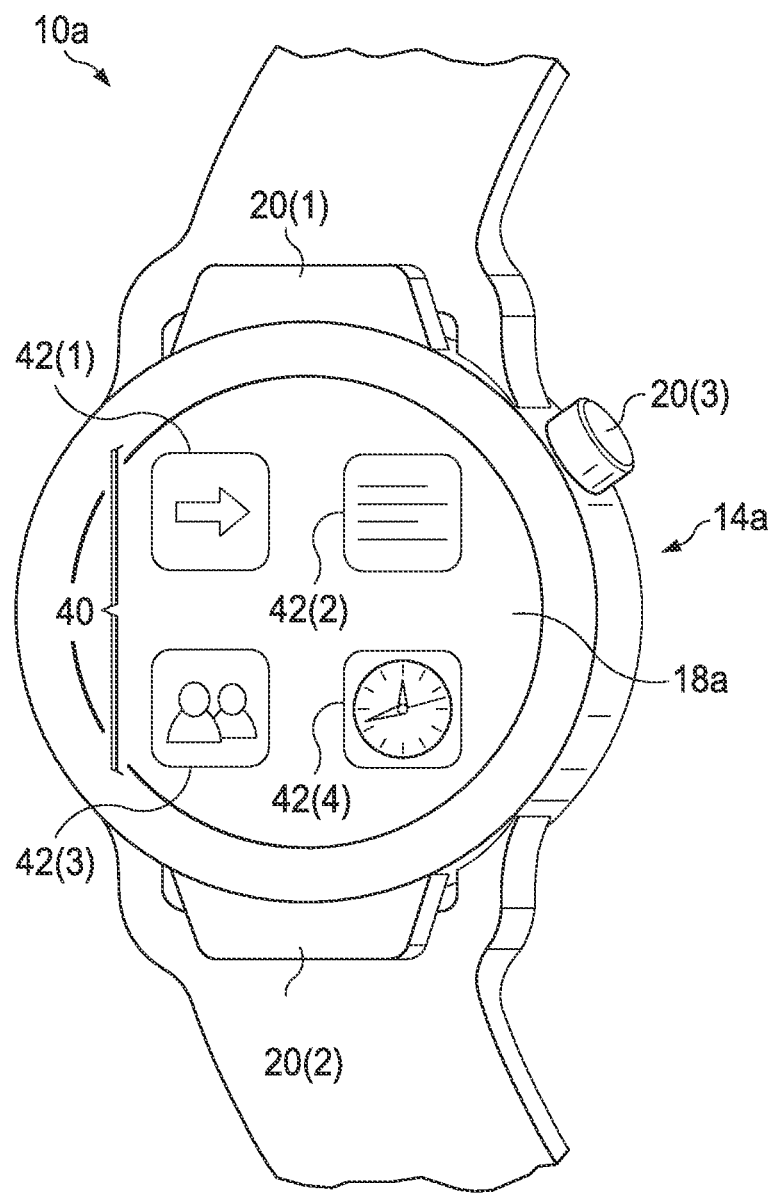
FIG. 1B is a simplified orthographic view illustrating an embodiment of a wearable electronic device, in accordance with one embodiment of the present disclosure.

Turning to FIG. 1B, FIG. 1B is a simplified orthographic partial view of wearable electronic device 10a in accordance with one embodiment of the present disclosure. Wearable electronic device 10a can include display portion 14a, which may include display 18a and input elements 20(1)-(3). In one or more embodiments, a GUI may be provided for wearable electronic device 10a, which may provide a means for a user to interact with wearable electronic device 10a. In one example implementation, the GUI may be configured to provide a set of 'home' navigation icons 40, which may allow a user the ability to access core features of wearable electronic device 10a. 'Home' navigation icons 40 may be displayed on display 18a by default and after completion of functions such as sending preconfigured messages, sending emergency messages, etc. As discussed herein, 'home' navigation icons may be referred to as a default set of navigation icons for wearable electronic device 10a.

In one or more embodiments, the core set of icons may include: a 'received messages' icon 42(1) (arrow), which may be associated with features provided by wearable electronic device 10a for reviewing messages received from one or more other users; a 'message' icon 42(2), which may be associated with features provided by wearable electronic device 10*a* for composing and sending messages to one or more other users; a 'people' icon 42(3), which may be associated with features provided by wearable electronic device 10*a* for reviewing the status, location, etc. for one or more other users that may have a connection to wearable electronic device 10*a* over a wireless network (e.g., they may have like wearable electronic devices in communication with wearable electronic device 10*a* over a wireless network); and a 'clock' icon 42(4), which may be associated with featured provided by wearable electronic device for reviewing, time, data, environmental information (temperature, barometric pressure, elevation, etc.) or other information. The example icons 42(1)-(4) illustrated in FIG. 1B are provided for illustrative purposes only and are not meant to limit the scope of the present disclosure. Virtually any other icons could be selected, and, thus, are clearly within the scope of the present disclosure.

In one or more embodiments, icons 42(1)-(4) may be configured by a user may be downloaded from an application marketplace, shared between users of like wearable electronic devices, combinations thereof or the like. In one or more embodiments, the configuration of home icons provided by the UI may be configured by a user.

In one or more embodiments, a user may navigate icons of provided by the GUI by interacting with either of input elements 20(1)-(2), which may scroll icons up or down across display 18*a*. For example, a user may press first input element 20(1) to scroll icons displayed on display 18*a* in an upward direction and may press second input element 20(2) to scroll icons displayed on display 18*a* in a downward direction.

In one or more embodiments, a user may access features of wearable electronic device by selecting a corresponding icon displayed on display 18*a*. In one or more embodiments, selection of an icon may include any of one or more interactions, such as, for example, providing a touch input to a corresponding icon, which may be registered by a pressure sensor (e.g., one of pressure sensors 28(1)-(4) beneath display 18*a*, navigating to an icon using input elements 20(1)-(2) and selecting an icon at a cursor position using one or more other touch inputs, combinations thereof or the like. In one or more embodiments, touch control logic, which can be configured in wearable electronic device 10*a* may output touch input data corresponding to the selection.

In one or more embodiments, device control logic, which can be configured in wearable electronic device 10*a*, may receive the touch input data and may cause one or more operations to be performed based on the input data. In various embodiments, the operations can include, but not be limited to, associating selection of an icon with other data stored in a memory in wearable electronic device 10*a* (e.g., preconfigured messages, contact information for other users that may have a connection with wearable electronic device 10*a*, etc.), causing to be displayed additional information on display 18*a*, causing preconfigured messages to be communicated using wireless communication circuitry in wearable electronic device 10*a*, causing execution of some program or other application, connecting with one or more other wearable electronic devices using the wireless communication circuitry, combinations thereof or any other operation that may be related to using and accessing features and operations of wearable electronic device 10*a*.

It should be understood that the arrangement of pressure sensors 28(1)-(4) and the default set navigation icons 40 in quadrants is provided for illustrative purposes only and other arrangements are certainly encompassed by alternative embodiments of the present disclosure (e.g., halves, thirds, fifths, etc.).

In general terms, wearable electronic device 10*a* can be configured with one or more messages that a user can configure and store in wearable electronic device. The preconfigured messages may be quick notes such as, for example, "OKAY?", "OKAY" "HEADING IN", "SEE THAT?", "COME HERE", "YES", "NO", etc. In one or more embodiments, the preconfigured messages may include approximately 15 characters, which may vary based on the size of display 18*a*. These examples are just a few examples of the many messages that can be preconfigured for wearable electronic device 10*a*. Virtually any other messages can be preconfigured for wearable electronic device 10*a*, and, thus, are clearly within the scope of the present disclosure. Such preconfigured messages may be used to provide quick interactions between users during high-activity periods where a user's attention may be divided between multiple tasks.

Wearable electronic device 10*a* may also provide the ability to connect to other like devices in a wireless network using wireless communication circuitry in wearable electronic device 10*a*. For example, wearable electronic device 10*a* may be configured with a unique device-type identifier (ID), which may be broadcast by wireless communication circuitry within wearable electronic device 10*a* throughout a wireless network. Wearable electronic device 10*a* may further include logic to identify the unique device-type ID from other like wearable electronic devices in a wireless network, which may also be broadcasting the device-type ID. As used herein in the present disclosure other 'like wearable electronic devices' are meant to refer to other wearable electronic devices having similar operation and communication features as wearable electronic device 10*a* for communicating preconfigured messages and/or other data or information between like wearable electronic devices.

In one or more embodiments, the logic in wearable electronic device may provide a user with the ability to connect to such like devices. In this manner, wearable electronic device 10*a* may provide a highly flexible and actively re-configuring list of friends, other users, etc. that a user of wearable electronic device 10*a* may maintain connectivity with through a wireless network. Aside from the convenience of quick messages and connectivity, wearable electronic device 10*a* may further provide a streamlined GUI through which a user may interact and communicate with other users in a wireless network that may be using like wearable electronic devices. Additionally, the ruggedized features of wearable electronic device 10*a* may provide for use of the device under many adverse conditions, which may further increase the flexibility of using wireless electronic device in many different environments.

For purposes of illustrating certain example features of electronic device 10*a* (and 10*b*, discussed below) the following foundational information may be viewed as a basis from which the present disclosure may be properly explained. Wearable electronic devices and electronic devices, such as mobile phones, often provide a means to communicate messages, but these means often involve a user to physically type a message into the device using a digital keyboard displayed on the device. Some devices may provide enhanced messaging input modes where a user may swipe letters together to form a word or message, but these input modes still require the user's attention to focus on a keyboard and connect letters to form a word or message. Some devices may also provide auto-complete features where a word or phrase may be completed after inputting a few letters of a word or a predetermined sequence of letters, but these input modes also require the user to concentrate on inputting letters on a keyboard. These problems are amplified in the case of wearable electronic devices, which typically have a smaller form factor than mobile phones and, thus, make inputting messages even more difficult, even under normal situations.

Such messaging input modes can be burdensome when a user may be active, for example, walking, running, playing sports or performing some other activity to which the user's attention may be focused. During other activities that may be performed under adverse conditions such as, for example, surfing, swimming, skiing, mountain climbing, etc., messaging may be prohibited altogether not only because a user's attention may be divided, but also because electronic devices with messaging capabilities often do not provide for operation in conditions where devices can get wet. There is a strong desire for user's that participate in such activities to be able to maintain communication with other users in case of an emergency, to check/verify the status of other users, and/or to provide brief dialogue between users, and, moreover, to do so in a quick and streamlined manner. Further, there is a strong desire to maintain connectivity with users in environments, such as, for example, surfing, cycling, running, etc. where the composition of users in an environment is constantly changing.

Particular embodiments described herein provide for a wearable electronic device such as an electronic bracelet, watch, wristband, armband, etc. that includes a circuit board coupled to a plurality of electronic components (which includes any type of components, elements, circuitry, etc.). In certain embodiments, the circuit board may be a flexible printed circuit board. The wearable electronic device may further include wireless communication circuitry and a means to store one or more preconfigured messages. Further, the wearable electronic device may be configured with a unique device-type ID, which may allow the wearable electronic device, using the wireless communication circuitry, to be able to be discovered by other like wearable electronic devices and also to discover other like wearable electronic devices in a wireless network. A user may be prompted to connect to other like devices in a wireless network. In some embodiments, the wearable electronic device may store a configurable list of other like devices to which the wearable electronic device has connected to in the past or that a user may desire to connect to. In such embodiments, the wireless electronic device may automatically connect to such devices when discovered in a wireless network.

The wearable electronic device may further include input elements and pressure sensors to provide a user with a quick and simple means to interact with the wearable electronic device in order to perform a variety of operations, including, but not limited to, selecting a preconfigured message to send to another user and selecting another electronic device or group of electronic devices (e.g., users or groups of user) to which to send the message using wireless communication circuitry provided in the wearable electronic device.

The wearable electronic device may also provide an intuitive and streamlined GUI through which a user may interact and communicate with other users in a wireless network. The GUI may provide a means for using (e.g., interacting, navigating, accessing, working with, etc.) other features and applications that may be provided by the wearable electronic device 10a. In one or more embodiments the wearable electronic device may include a digital clock, a digital calendar, a digital compass, a temperature sensor, a humidity sensor, a barometric pressure sensor, an elevation sensor, a global positioning system (GPS) receiver to facilitate displaying location information of a user wearing the wearable electronic device, combinations thereof or the like. In various embodiments, the GUI may provide a user the ability to check or monitor information related to such features.

Additionally, the wearable electronic device may provide a means for sending emergency messages to a group of users by pressing/squeezing a predetermined configuration of input elements on wearable electronic device. Upon pressing the predetermined configuration of input elements, the wearable electronic device may communicate the emergency message to all users that may have a connection to the wearable electronic device in a wireless network.

In one or more embodiments, a user may connect wearable electronic device 10a to another electronic device (e.g., phone, laptop, tablet, etc.) through a wireless connection in order to preconfigure one or more messages in memory in wearable electronic device 10a. In one or more embodiments, a user may configure and store contact information (e.g., Bluetooth™ PIN code, phone number (for wirelessly connecting through a 3G/4G/LTE service provider network, user identifier (ID), such as a user's name or other identifying information) or other information which may be used to communicate between like wearable electronic devices) for one or more users or groups of users of other like wearable electronic devices. In one or more embodiments, contact information for one or more users may be stored upon connecting to one or more like wearable electronic devices (e.g., Bluetooth™ link-key, etc.). In one or more embodiments, wearable electronic device may automatically connect to such devices when discovered in a wireless network. These examples are just a few of the many means and methods for configuring and storing messages and contact information for a wearable electronic device. Virtually any other means and methods may be used, and, thus, are clearly within the scope of the present disclosure.

In one or more embodiments, messages can be communicated using a short messaging service (SMS), multimedia messaging service (MMS), application to person (A2P) messaging, combinations thereof or the like.

In use, a user may interact with the wearable electronic device by interacting with input elements 20(1)-(3) or by interacting with display 18a (e.g., pressure sensors 28(1)-(4) configured beneath display 18a) to select one or more icons or other information that may be displayed on display 18a. The input elements 20(1)-(3) and/or pressure sensors 28(1)-(4) may register touch inputs associated with the interactions. In one or more embodiments, touch control logic, which may be configured in wearable electronic device 10a, may output touch input data corresponding to the interactions. In one or more embodiments, device control logic, which may also be configured in wearable electronic device may receive the touch input data and may associate the touch input data with one or more interactions with the GUI for selecting content that may be displayed on display 18a (e.g., a preconfigured message and one or more users) and may determine an appropriate operation to perform on behalf of the interactions. In various embodiments, the operations may include causing to be displayed additional information, including icons, preconfigured messages, users, etc. on display 18a, execution of software or some other application configured in wearable electronic device 10a by a processor or controller, communication of selected preconfigured message to one or more selected users using wireless communication circuitry in wearable electronic device 10a, communication of preconfigured emergency messages to one or more other users [note, sending preconfigured emergency messages may be a feature of wearable electronic device 10a that may not require a user to navigate the GUI in order to communicate the messages], combinations thereof, or any other similar action.

Thus, the wearable electronic device may provide many streamlined means for communicating messages and maintaining connectivity between users of like wearable electronic devices in a wireless network. Further by providing ruggedized features, the wearable electronic device may be used in many adverse conditions to further maintain connectivity for a user throughout many environments.

Other features of wearable electronic device can include alerts, which device control logic in wearable electronic device 10a can cause to be generated based on one or more input stimuli, which can include messages received on wearable electronic device 10a, confirmations of actions performed using wearable electronic device 10a, combinations thereof or the like. In one or more embodiments, device control logic may cause an alert to be generated when a message may be received by the device. In one or more embodiments, device control logic may cause an icon to be displayed or some other indication to be displayed on display 18a (e.g., multiple display screen flashes, display screen color changes, etc.) to alert a user of a received message. In one or more embodiments, device control logic may cause an audible tone or sequence of tones to be generated by a speaker, which may be contained in the wearable electronic device to alert a user of a received message. In one or more embodiments, the wearable electronic device can include one or more haptic devices, such as, for example, linear resonant actuators (LRAs), eccentric rotating mass (ERM) actuators, piezoelectric elements, etc. In various embodiments, device control logic in the wearable electronic device can cause a haptic effect (e.g., vibration, series of vibrations, etc.) to be generated, which may alert a user of a received message. In one or more embodiments, alerts, haptic effects, or other features may also be provided as a confirmation of a message being communicated to other users.

As used herein in the present disclosure, the terms 'selecting a user or group of users' may be used interchangeably with 'selecting another electronic device' or 'selecting a group of electronic devices' (which can be inclusive both of like wearable electronic devices and other non-like electronic devices—mobile phones, tablets, etc.) for which to communicate a preconfigured message, as communications between users may be performed electronically through the users' respective electronic devices (e.g., wearable electronic device 10a).

In at least one example embodiment, the circuit board of wearable electronic device 10a is a general circuit board that can hold various components of an internal electronic system of wearable electronic device 10a. The components may include a central processing unit (CPU), a memory, etc. More specifically, the circuit board can provide the electrical connections by which the other components of the system can communicate.

Any processors (inclusive of digital signal processors, microprocessors, supporting platform hardware, etc.), memory elements, etc. can be suitably coupled to the circuit board based on particular configuration need, processing demands, electronic device designs, etc. Note that particular embodiments of the present disclosure may readily include a system on chip (SOC) central processing unit (CPU) package. An SOC represents an integrated circuit (IC) that integrates components of a computer or other electronic system into a single chip. The chip may contain digital, analog, mixed-signal, and often radio frequency functions: all of which may be provided on a single chip substrate. Further, the architecture can be part of any type of wearable electronic device, tablet, smartphone (inclusive of Android™ phones, i-Phones™), i-Pad™, Google Nexus™, Microsoft Surface™, video processing components, any type of touch-enabled input element, etc.

Note also that particular embodiments of the present disclosure may include logic (e.g., input control logic and device control logic, etc.) that can be implemented in a variety of manners. For example, logic can be implemented in software, which may mean that a processor may be instructed to detect interactions with an input element, determine a preconfigured message to communicate and one or more other electronic devices to which to communicate the message, determine one or more icons, or other elements to display on display 18a, etc. In another example, logic can be implemented in firmware that a separate device may utilize. In yet another example, logic can be implemented as a standalone hardware chip controller.

Turning to FIG. 2, FIG. 2 is a simplified block diagram illustrating an embodiment of wearable electronic device 10a in accordance with one embodiment of the present disclosure. Wearable electronic device 10a can include display portion 14a, which can include a wireless module 44. Wireless module 44 (e.g., Wi-Fi module, Bluetooth™ module, 3G/4G/LTE cellular wireless module or other wireless communication circuitry) may allow wearable electronic device 10a to communicate with a network 58, an electronic device 32 and a pair of other like wearable electronic devices: a first other like wearable electronic device 10a(2) and a second other like wearable electronic device 10a(3) through a wireless connection. As noted above, like wearable electronic devices may include other wearable electronic devices that may have a same operational configuration as wearable electronic device 10a for communicating preconfigured messages, etc. It is assumed, since first and second wearable electronic devices 10a(2), 10a(3) are like wearable electronic devices, that they also include corresponding wireless modules, although these are not shown in FIG. 2.

The wireless connection may be any 3G/4G/LTE cellular wireless, WiFi/WiMAX connection, Bluetooth™, any 802.11 protocol or some other similar wireless connection. In an embodiment, the wireless connection may be a wireless personal area network (WPAN) to interconnect wearable electronic device to network 58, electronic device 32 and/or like wearable electronic devices 10a(2), 10a(3) within a relatively defined area using, for example, Bluetooth™, invisible infrared light, Wi-Fi, etc. which can range from approximately 10 m to approximately 100 m. In another embodiment, the wireless connection may be a wireless local area network (WLAN) that links wearable electronic device 10a to network 58, electronic device 32 and other like wearable electronic devices 10a(2), 10a(3) over a relatively short distance using a wireless distribution method, usually providing a connection through an access point for Internet access.

The use of spread-spectrum or OFDM technologies may allow wearable electronic device to move around within a local coverage area, and still remain connected network 58, electronic device 32 and/or other like wearable electronic devices 10a(2), 10a(3). In an embodiment, wearable electronic device 10a may connect to network 58 through electronic device 32 (e.g., using a Bluetooth™ connection or other 802.11 protocol connection with electronic device 32), thereby allowing wearable electronic device 10a to piggyback a connection to network 58 using electronic device 32. In another embodiment, the wireless connection may be a 3G/4G/LTE cellular wireless connection, which may allow wearable electronic device to communicate with electronic device 32 and/or like wearable electronic devices 10a(1), 10a(2) over long distances using network 58, which may be a service provider network.

Network 58 may be a series of points or nodes of interconnected communication paths for receiving and transmitting packets of information that propagate through network 58. Network 58 offers a communicative interface and may be any local area network (LAN), wireless local area network (WLAN), metropolitan area network (MAN), Intranet, Extranet, WAN, virtual private network (VPN), cellular network or any other appropriate architecture or system that facilitates communications in a network environment. Network 58 can comprise any number of hardware or software elements coupled to (and in communication with) each other through a communications medium. Electronic device 32 may be a computer (e.g., notebook computer, laptop, tablet computer or device), a phablet (phone-tablet hybrid), a cellphone, a personal digital assistant (PDA), a smartphone, a movie player of any type, router, access point, another wearable electronic device or other device that includes a circuit board coupled to a plurality of electronic components (which includes any type of components, elements, circuitry, etc.).

In one or more embodiments, like wearable electronic devices (e.g., 10a, 10a(2), 10a(3)) may be wirelessly connected over a WPAN using a Bluetooth™ connection. The following example for pairing like wearable electronic devices 10a(2) using Bluetooth™ is provided to illustrate various features of wearable electronic device 10a, however, it should be understood that any electronic devices (e.g., electronic device 32 and/or like wearable electronic device 10a(3)) may be paired in a similar fashion. Moreover, it should be understood that the example is generalized to illustrate these features and does not include all technical details of establishing a Bluetooth™ connection.

In an embodiment, wearable electronic device 10a may be paired to like wearable electronic device 10a(2) using a Personal Identification Number (PIN) code, which can be configured/shared between users that desire to pair their devices using a Bluetooth™ through a pairing process in which information is exchanged between the devices to establish a Bluetooth™ wireless connection between the devices. During the pairing process, each wearable electronic device 10a and 10a(2) may exchange a link-key to establish a secure connection between the devices. Link-keys are typically 48 HEX digit-based encrypted codes, which allow electronic devices to establish a secure Bluetooth™ connection. If an appropriate PIN code has been established between the devices, a link key may be exchanged between wearable electronic device 10a(1) and wearable electronic device 10a to establish a connection. Each wearable electronic device, 10a and 10a(2), may store a link-key and PIN code for subsequent connections to be established between the devices. Further, each device may automatically connect to each other when they may be within range of each other, which can typically be in an approximate range of 10 m to 100 m.

Once connected, users of like wearable electronic devices may communicate using the means and methods described herein. Establishing a wireless connection with another electronic device using Bluetooth™ connection is only one example in which a wireless connection may be established with other electronic devices, including other like wearable electronic devices. In one or more embodiments, a wireless connection may be established with other electronic devices using a Wi-Fi/WiMAX connection or any other 802.11 protocol wireless connection. These examples are only a few of the many means and methods that can be used to log-in a user to another electronic device. Virtually any other means and methods can be used, and, thus, are clearly within the scope of the present disclosure.

Wearable electronic device 10a (and 10a(2) and 10a(3)) may include one or more memory elements (e.g., a subscriber identity module (SIM), random access memory (RAM), dynamic random access memory (DRAM), synchronous dynamic random access memory (SDRAM), flash memory, etc.), which may be configured to store user preferences, user information (e.g., user ID, user name, photo, etc.) phone numbers (for 3G/4G/LTE capable wearable electronic devices), network keys, Bluetooth™ (PIN) codes and Bluetooth™ link-keys for connecting to one or more other electronic devices including like wearable electronic devices, etc.

In an embodiment, wearable electronic device 10a can include features to discover other like wearable electronic devices that may be connected to network 58. In an embodiment, wearable electronic device 10a may include a unique device-type ID, which may allow the wearable electronic device, using the wireless communication circuitry, to be able to be discovered by other like wearable electronic devices and also to discover other like wearable electronic devices in a wireless network. In one or more embodiments, a device-type ID may be part of a media access control (MAC) address, which wearable electronic device 10a may broadcast using wireless communication circuitry for WiFi/WiMAX connections, Bluetooth™ connections or any other 802.11 protocol.

In one or more embodiments, the MAC address may contain manufacturer information, which may be used to set a unique device-type ID for wearable electronic device. In one or more embodiments, a device-type ID may be part of an International Mobile Station Equipment Identity (IMEI) or IMEI Software Version (IMEISV), for wearable electronic devices that may include a subscriber identity module (SIM) card. These examples are only a few of the many means and methods that may be used to configure a unique device-type ID for wearable electronic device 10a. Other means and methods may be used, and, thus, are clearly within the scope of the present disclosure. In one or more embodiments, wearable electronic device 10a may prompt a user to connect to a like device discovered in a wireless network or may automatically connect to the like device, for example, if wearable electronic device has previously connected to the other like device.

By providing the ability to discover like wearable electronic devices in a wireless network, wearable electronic device 10a may provide a highly configurable and adaptable means for communicating with users of other devices in a changing active settings where users may enter and leave a network environment at various times, such as surfing, cycling, running, or any other outdoor activity where the landscape of users may change quickly through time. By continually updating the other users that a first user of wearable electronic device 10a may communicate with within an environment, wearable electronic device 10a may provide an effective means to maintain connectivity for the first user during outdoor activities, where the landscape of users can change drastically over time.

For the various embodiments described herein, it is assumed that a wireless connection may be established for users to communicate preconfigured messages, etc. using wearable electronic device 10a.

Figure 3A:
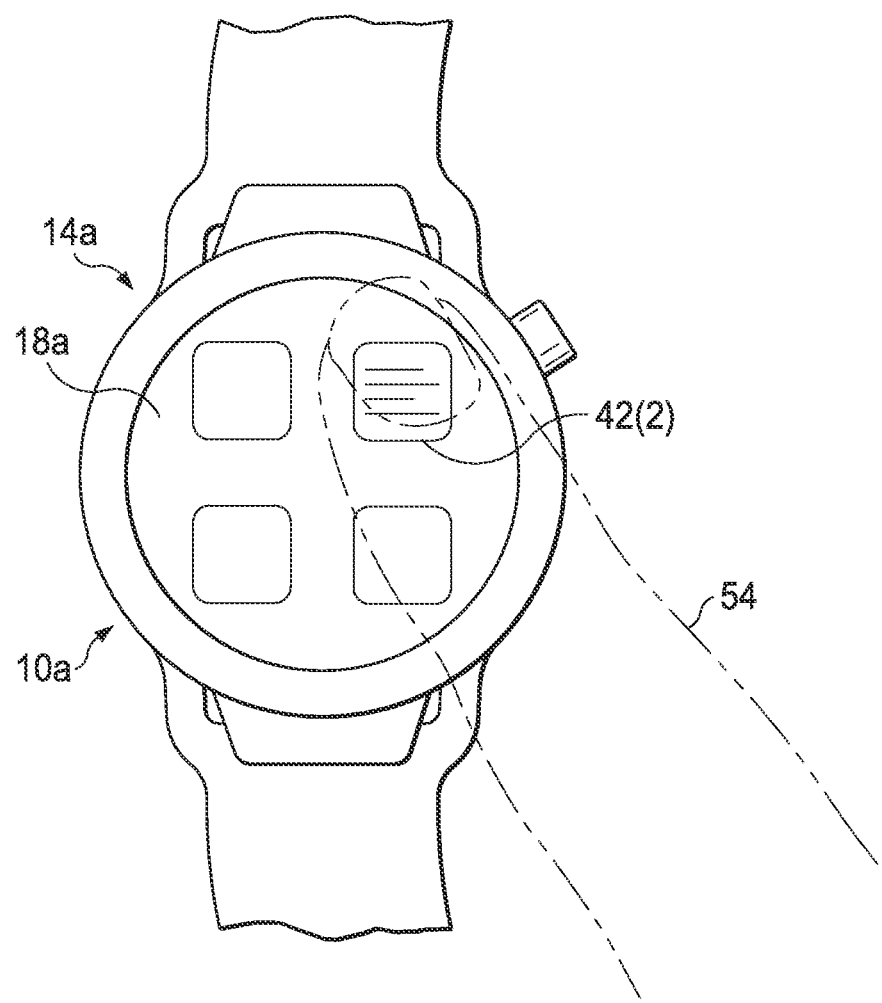
FIG. 3A is a simplified partial top view illustrating an embodiment of a wearable electronic device, in accordance with one embodiment of the present disclosure.

Turning to FIG. 3A, FIG. 3A is a simplified partial top view of wearable electronic device 10a in accordance with an embodiment of the present disclosure. Wearable electronic device 10a can include display portion 14a, which may include display 18*a* and input elements 20(1)-(3). FIG. 3A provides an illustrative example of sending a preconfigured message.

As shown in FIG. 3A a first user may touch 'message' icon 42(2) using a finger 54 to begin sending a preconfigured message. A pressure sensor (e.g. pressure sensor 28(2) as shown in FIG. 1A), may register the touch input. In an embodiment, touch control logic, which can be configured in wearable electronic device 10*a*, may output touch input data corresponding to the user's selection. Device control logic in wearable electronic 10*a* device may receive the touch input data, may associate the interactions with inputs for selecting a preconfigured message and may display one or more preconfigured messages on display 18*a*, which a user may select to communicate to another user (e.g., another wearable electronic device).

FIG. 3B is a simplified partial top view of wearable electronic device 10*a* following the selection of 'message' icon 42(2) in accordance with an embodiment of the present disclosure. As illustrated in FIG. 3B, a list of one or more preconfigured messages 50 can be displayed on display 18*a*. As shown in FIG. 3B, four messages, a first message 50(1) 'OKAY?', a second message 50(2) 'HEADING IN', a third message 50(3) 'SEE THAT' and a fourth message 50(4) 'COME HERE' may be displayed on display 18*a*. Note, the preconfigured messages 50(1)-50(4) are provided for illustrative purposes only and are not meant to limit the scope of the present disclosure. Other preconfigured messages are certainly encompassed by alternative embodiments of the present disclosure.

In an embodiment, wearable electronic device may highlight a default message upon displaying the preconfigured message list. As shown in FIG. 3B, first message 50(1) 'OK?' is highlighted. In various embodiments, the first user can scroll through the list by pressing one of input elements 20(1)-(2) to scroll the list up or down.

Assume, for purposes of the present example, that the first user desires to send the first message 50(1) 'OK?' to another user. As shown in FIG. 3B, the first user may select first message 50(1) by pressing, using finger 54, third input element 20(3), which may register the selection. Touch control logic in wearable electronic device 10*a* may output touch input data corresponding to the selection. Device control logic in wearable electronic device 10*a* may receive the touch input data, may associate the interactions with inputs for selecting a preconfigured message to be communicated and may display on display 18*a* one or more user icons (e.g., user ID, user name, picture, etc.) for other users that may have a connection to wearable electronic device 10*a* to which the message may be communicated.

FIG. 3C is a simplified partial top view of wearable electronic device 10*a* following the selection of the first message in accordance with an embodiment of the present disclosure. As illustrated in FIG. 3C, a list of one or more user icons 52 may be displayed on display 18*a* that the first user may have a connection to over a wireless network via wearable electronic device 10*a*. In one or more embodiments, icons for different users may be configurable by the first user and stored on wearable electronic device to provide a means to distinguish different users displayed on display 18*a*.

In an embodiment, wearable electronic device 10*a* may position a cursor 66 over a default user icon (e.g., user icon 52(1)) upon displaying the list of user icons 52. In various embodiments, the first user can scroll through the list by pressing one of input elements 20(1)-(2).

Turning to FIG. 3D, FIG. 3D is a simplified partial top view of wearable electronic device 10*a* in accordance with one embodiment of the present disclosure. In one or more embodiments, wearable electronic device 10*a* may provide for the ability to communicate a preconfigured message to multiple users by allowing multiple user icons to be selected through scrolling cursor 66 through user icons 52 and pressing input element 20(3) on corresponding user icons for users that the first user desires to send a preconfigured message. A shown in FIG. 3D the first user has selected first user has selected other user icons 52(1) and 52(6) in order to communicate the preconfigured message to those corresponding users.

Figure 3E:
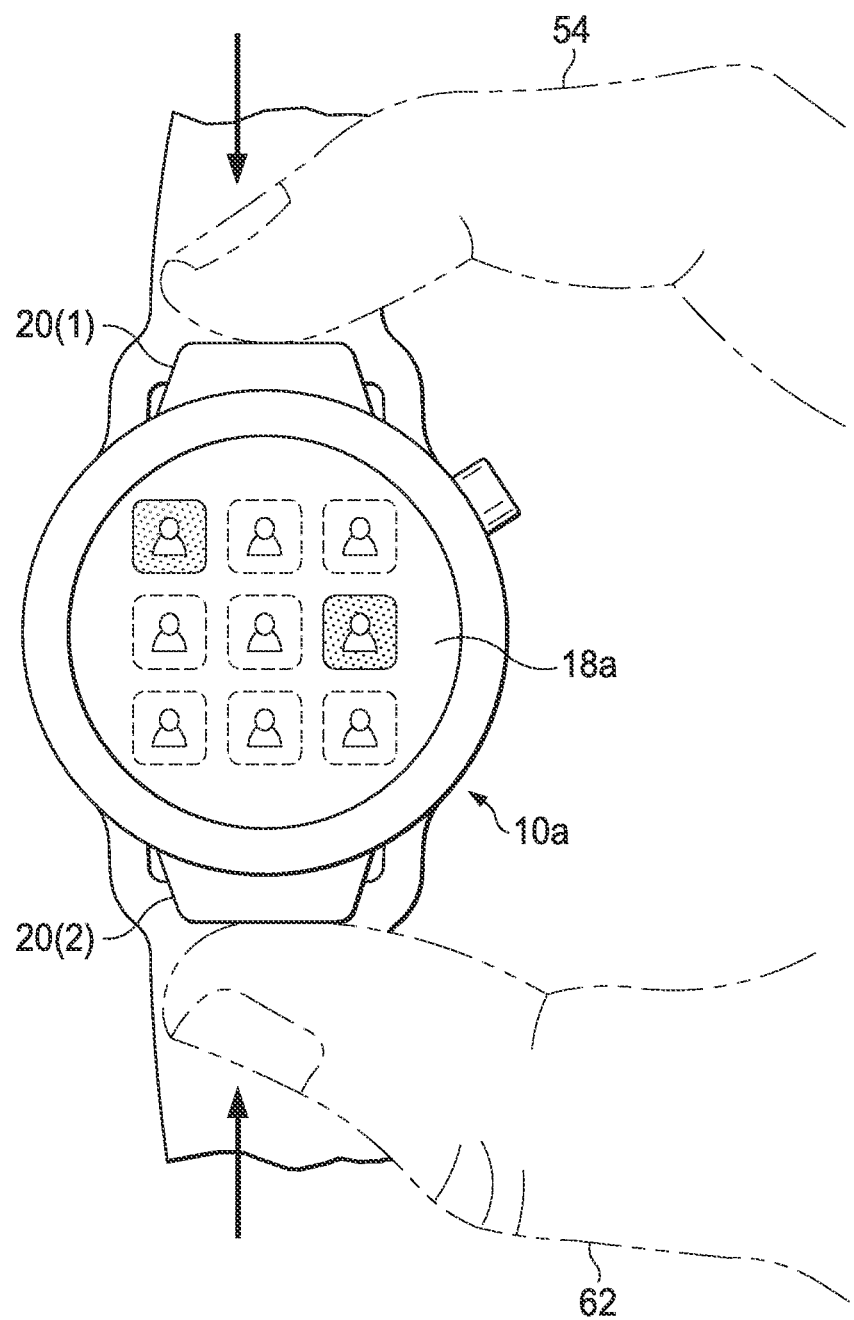
FIG. 3E is a simplified partial top view illustrating an embodiment of a wearable electronic device, in accordance with one embodiment of the present disclosure.

FIG. 3E is a simplified partial top view of wearable electronic device 10*a* following the selection of the user icons in accordance with an embodiment of the present disclosure. In one or more embodiments, communicating a preconfigured message can be initiated by a user simultaneously pressing input elements 20(1) and 20(2). Touch control logic in wearable electronic device 10*a* may output touch input data corresponding to the selection. Device control logic in wearable electronic device 10*a* may receive the touch input data, may associate the interactions with inputs associated with communicating a previously selected preconfigured message to the selected users corresponding to user icons and may communicate, using wireless communication circuitry in wearable electronic device 10*a*, the previously selected message 'OKAY?' to selected users. As shown in FIG. 3E, the first user is initiating the communication to users corresponding to user icons 52(1) and 52(6) by pressing by pressing first input element 20(1) and second input element 20(2) simultaneously using finger 54 and thumb 62.

In one or more embodiments, the device control logic may cause to be displayed a confirmation message on display 18*a* after the message has been communicated, may generate a haptic effect using one or more haptic elements that may be contained in wearable electronic device 10*a*, which may indicate that the message was sent, may generate an audible alert using a speaker that may be contained in wearable electronic device 10*a*, which may indicate that the message was sent, combinations thereof or the like. Following communication of a message and/or displaying a confirmation message, device control logic may display the default 'home' navigation icons on display 18*a*.

It should be understood that the example input element presses and display icon selections as discussed above are provided for illustrative purposes only to highlight various features of wearable electronic device 10*a* and are not meant to limit the scope of the present disclosure. Virtually any other means and methods may be used to select a preconfigured message, select one or more users to which to communicate the message and to communicate the message to users of other like wearable electronic devices, and, thus, are clearly within the scope of the present disclosure.

Figure 4:
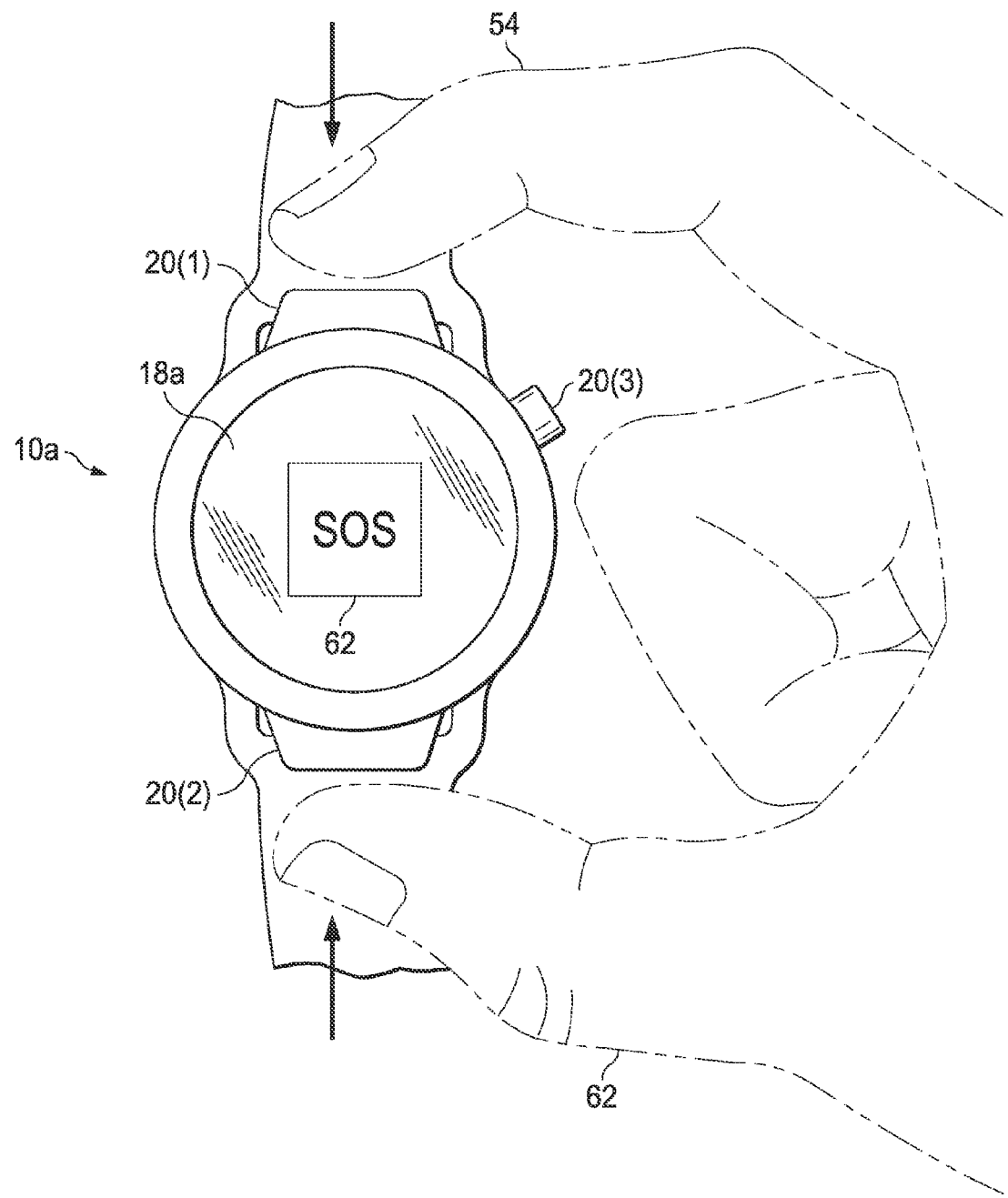
FIG. 4 is a simplified partial top view illustrating an embodiment of a wearable electronic device, in accordance with one embodiment of the present disclosure.

Turning to FIG. 4, FIG. 4 is a simplified partial top view of wearable electronic device 10*a* in accordance with an embodiment of the present disclosure. As noted above, wearable electronic device 10*a* may provide a user with the ability to communicate a preconfigured emergency message to a group of users that may have connection to wearable electronic device 10*a* in a wireless network.

In one or more embodiments, wearable electronic device may be configured to require multiple inputs before communicating an emergency message in order to avoid sending inadvertent emergency message. Thus, sending an emergency message may involve multiple interactions from a user; a first interaction to initiate sending an emergency message and a second interaction to confirm sending the message.

In one or more embodiments, a user may simultaneously squeeze first input element 20(1) and second input element 20(2) to initiate sending a preconfigured emergency message. Touch control logic in wearable electronic device 10a may output touch input data corresponding to the selections. FIG. 4 illustrates a user pressing input elements 20(1) and 20(2) using finger and thumb 62 to initiate sending a preconfigured emergency message 60 ('SOS').

In an embodiment, device control logic in wearable electronic device 10b may receive the touch input data, and may first determine whether the simultaneous squeeze corresponds to inputs for communicating an emergency message or whether the simultaneous squeeze corresponds to sending a selected preconfigured message to one or more selected users. Recall that the same simultaneous squeeze interaction can be used to send a selected preconfigured message to one or more selected users. To make the determination, device control logic may determine whether a preconfigured message was previously selected before the simultaneous touch input was registered. If so, the device control logic may ignore the inputs, or in some embodiments, may prompt the user to select one or more users to which to communicate a preconfigured message (e.g., if a user presses input elements 20(1) and 20(2) before selecting users to send a message as described in FIG. 3D, above).

If no preconfigured message was previously selected, device control logic may cause to be displayed an emergency message 60 (e.g., 'SOS') on display 18a and may enter a wait state for a predetermined period of time to wait for a confirmation input to be input by the user. In one or more embodiments, a user may confirm the sending the emergency message by pressing input element 20(3). Note, this action is not shown in FIG. 4. If the user confirms the emergency communication, device control logic in wearable electronic device may automatically communicate, using wireless communication circuitry in wearable electronic device 10a, the preconfigured emergency message 60 to one or more users that may have a connection to wearable electronic device 10a over a wireless network. In this manner, device control logic may automatically determine both a preconfigured message to send and users to which to communicate the preconfigured message based on a particular sequence of input element touches.

If no confirmation is made, however device control logic may continue to wait for the confirmation until the predetermined wait state time period has expired. After expiration of the wait state time period, device control logic may cause to be displayed the default 'home' navigation icons for wearable electronic device 10a on display 18a.

In one or more embodiments, the required input element touches to initiate and confirm send an emergency message, as well as the emergency message to be communicated may be configured by a user according to user preferences.

Other confirmations can be configured for wearable electronic device 10a. In one or more embodiments, the confirmation could be configured to be a second simultaneous squeeze of first and second input elements 20(1) and 20(2) or in some embodiments, the required inputs for initiating an emergency communication could include a simultaneous squeeze and hold of first and second input elements 20(1) and 20(2) for a predetermined period of time. The press and hold could be used to both initiate the emergency communication and confirm the communication within a same input. In an embodiment, input control logic could be configured in wearable electronic device to output touch input data that includes a touch time information, which could be used by device control logic to select an emergency message to communicate, initiate the confirmation timeout period and confirm the confirmation timeout period using the touch input data.

In one or more embodiments, emergency messages communicated from wearable electronic device 10a may include a unique emergency message ID, which may indicate that the message is an emergency message.

In one or more embodiments, the emergency message ID can be used by other like wearable electronic devices that may receive an emergency message to rebroadcast the emergency message to other like wearable devices that they may be connected to in a wireless network. In this manner, emergency messages may be daisy chained throughout an ecosystem of like wearable electronic devices in a particular wireless network. Thus, wearable electronic device 10a may provide a means for maintaining connectivity between users during emergency situations.

In other embodiments, device control logic in wearable electronic device 10a may cause unique alerts to be generated for received emergency messages. In one or more embodiments, this can include multiple haptic effects, of a same or different vibration; multiple audible alerts, of a same or different tone, a unique received message icon, which can be displayed on display 18a, combinations thereof or the like. In one or more embodiments, wearable electronic device 10a may include GPS location information in an emergency message indicating a location of the user from which the message was received, which may be displayed with the message when it may be received by other like wearable electronic devices.

For remaining discussions of wearable electronic device 10a, various GUI features may be discussed without describing touches, selections, touch control logic functions, device control logic functions, etc. as described above for FIGS. 3A-3E and 4. It should be understood, based on the previous examples, that wearable electronic device 10a may perform various operations using logic to detect interactions (e.g., selections of GUI icons, etc.) with wearable electronic device, to output touch input data corresponding to the interactions, and to cause one or more actions based on the detected interactions.

Figure 5B:
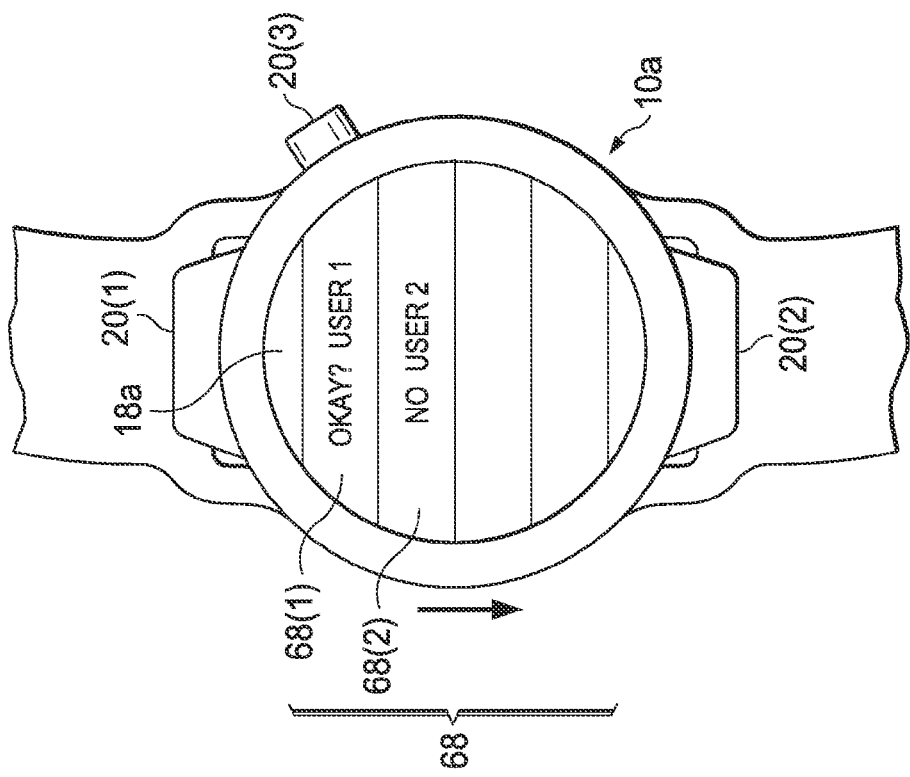
FIG. 5B is a simplified partial top view illustrating an embodiment of a wearable electronic device, in accordance with one embodiment of the present disclosure.
Figure 5A:
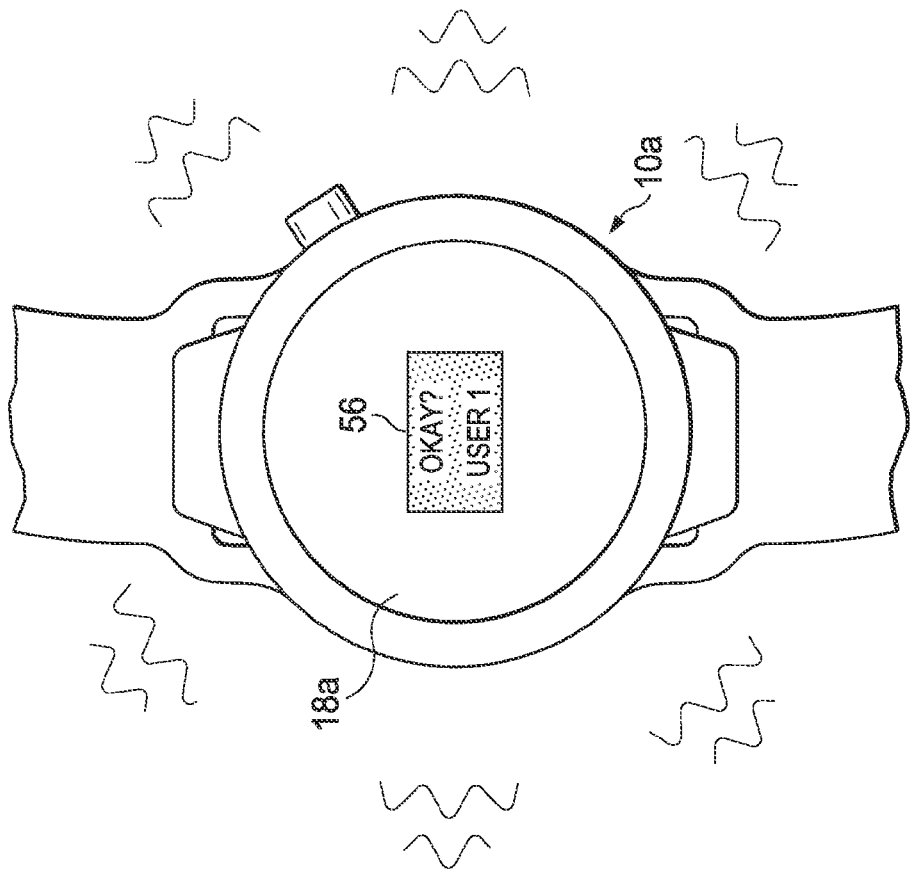
FIG. 5A is a simplified partial top view illustrating an embodiment of a wearable electronic device, in accordance with one embodiment of the present disclosure.

Turning to FIG. 5A, FIG. 5A is a simplified partial top view of 10a wearable electronic device in accordance with an embodiment of the present disclosure. Wearable electronic device 10a can include display portion 14a, which may include display 18 and input elements 20(1)-(3). FIG. 5A illustrates a received message notification 56 provided on display 18a. As noted above, one or more alerts can be generated to indicate that a message has been received. These alerts can be provided in addition to received message notification 56 as shown in FIG. 5A. Message alert 56 may provide the received message and an identity of the user from which the message was received. Here, message alert 56 displays 'OKAY?' and 'USER1' for a message received from USER1. In one or more embodiments, a user may clear a received message by pressing one or more of input elements 20(1)-(3).

Turning to FIG. 5B, FIG. 5B illustrates an example list of received messages 68 that can be displayed on display 18a. A user may review received messages by pressing the 'received messages' icon 42(1) as shown above in FIG. 1B. In an embodiment, received messages may be displayed in a message/user format that may display a received message and a user from which the message was received. For example, a first message 68(1) reading 'OK?' may have been received from 'USER1' and a second message 68(2) reading 'NO' may have been received from 'USER2'. It should be understood that the information shown in FIG. 5B is provided for discussion purposes only and is not meant to limit the scope of the present disclosure. In one or more embodiments a user may scroll through the messages by pressing either of input elements 20(1)-(2).

In one or more embodiments, other information may be displayed for each message, including but not limited to, a time that a message was received, a picture of a user rather than contact information for a user, combinations thereof or the like. These examples are only a few of the many different types of information that can be displayed for received messages. Virtually any other information could be displayed, and, thus, is clearly within the scope of the present disclosure.

In one or more embodiments, to respond to a received message, a user may select a message (e.g., scrolling to a message using input elements 20(1) or 20(2) and selecting the message using third input element 20(3)), and device control logic in wearable electronic device can cause one or more additional prompts to be displayed, which may enable the user to respond to the message. In one or more embodiments, device control logic in wearable electronic device may cause one or more preconfigured messages to be displayed, which a user can select to send to the user from which the message was received. In another embodiment, device control logic may cause a prompt to be displayed for selecting to whom a response may be communicated. For example, a user may choose to respond to the user from which the message was received or the user may select other users to whom a response message may be communicated, e.g., using the selection means as shown in FIGS. 3C-3E to select other users to communicate the message. The order of operations described in the above examples is provided for discussion purposes only to illustrate various features that may be provided by wearable electronic device 10a. It should be understood that any order of operations could be performed to respond to a message received from another user within the scope of the present disclosure.

Turning to FIG. 6A, FIG. 6A is a simplified partial top view of 10a wearable electronic device in accordance with an embodiment of the present disclosure. Wearable electronic device 10a can include display portion 14a, which may include display 18a and input elements 20(1)-(3). FIG. 6A illustrates a mapping GUI that may be provided by wearable electronic device 10a with a first mapping icon 72 corresponding to a location of a first user wearing wearable electronic device 10a and various second mapping icons 74 corresponding to other users (e.g., other like wearable electronic devices) in relation to the first user.

In one or more embodiments, wearable electronic device 10a can include a GPS receiver, which may provide GPS location information about the location of wearable electronic device 10a. In one or more embodiments, device control logic in wearable electronic device 10a may be configured to transmit GPS location information (e.g., latitude/longitude) to other like wearable electronic devices that it may be connected to using wireless communication circuitry in wearable electronic device 10a. Wearable electronic device 10a may include logic to process GPS location information and display locations of one or more users in relation to a user wearing wearable electronic device 10a on the map.

Transmitting GPS location information to other like wearable electronic devices may be achieved through one or more means or methods. In one or more embodiments, wearable electronic device 10a may be configured to communicate GPS information to other like wearable electronic devices at predetermined intervals, in concert with communicating an emergency message, only during certain periods, say, for example, during certain activities, combinations thereof or the like. In one or more embodiments, the mapping GUI may be accessed through one or more input element, icon or other selections or may even be displayed upon receiving an emergency message from another use.

In one or more embodiments, other information may be displayed on the mapping GUI, such as for example, directional indicators 76, which may indicate the direction that wearable electronic device 10a is facing. In one or more embodiments, wearable electronic device 10a may provide the ability to view GPS locations of other users on a map, as shown in FIG. 6A. It should be noted that the graphics for first mapping icon 72 and second mapping icons 74 are provided for illustrative purposes only and is not meant to limit the scope of the embodiments discussed herein. Virtually any other graphics or other information could be provided by wearable electronic device 10a, and, thus, are clearly within the scope of the present embodiments.

In one or more embodiments, wearable electronic device may also generate, based on GPS information received from one or more other users, proximity alerts, which may be configured to provide alerts for other users getting too close or getting too far away from a user operating wearable electronic device 10a. Consider an example in a surfing environment, a first user of wearable electronic device may desire to know when other users (wearing other like wearable electronic devices) may be approaching the location of the first user, e.g., to try and avoid a collision, etc. The first user may configure (e.g., using an external device such as a mobile phone, laptop, etc.) various proximity alerts, which device control logic in wearable electronic device 10a may cause a proximity alert to be generated when other users are within a predetermined distance—as set by the first user—of the first user (e.g., within a predetermined distance of wearable electronic device 10a). In this manner, wearable electronic device may provide additional features, which may aid in maintaining connectivity and awareness of a user of wearable electronic device under adverse and changing environmental conditions.

In one or more embodiments, proximity alerts may include messages displayed on display 18a, haptic effects, audible alerts, combinations thereof or the like. In one or more embodiments, proximity alerts may be configured to provide incremental proximity alerts for various distances, proximity alerts for incremental distances, proximity alerts for multiple users, combinations thereof or the like.

Turning to FIG. 6B, FIG. 6B is a simplified orthographic partial view of wearable electronic device 10a in accordance with an embodiment of the present disclosure. In one or more embodiments, a first user (e.g., user wearing wearable electronic device 10a) may scroll a cursor 78 through the second mapping icons 74 users displayed on the map by pressing second input element 20(2) using a thumb 70. In one or more embodiments, upon scrolling cursor 78 to a desired other user, the first user may press third input element 20(3), for example, to view other information about the user or send the user a message. In one or more embodiments, other information may include a list of messages received by the other user or any type of other status information regarding the other user. In one embodiment, by pressing third input element 20(3), device control logic in wearable electronic device 10a may cause one or more options to be displayed, from which the first user may select to perform other functions such as viewing information about the user or sending a message to the user.

Figure 6C:
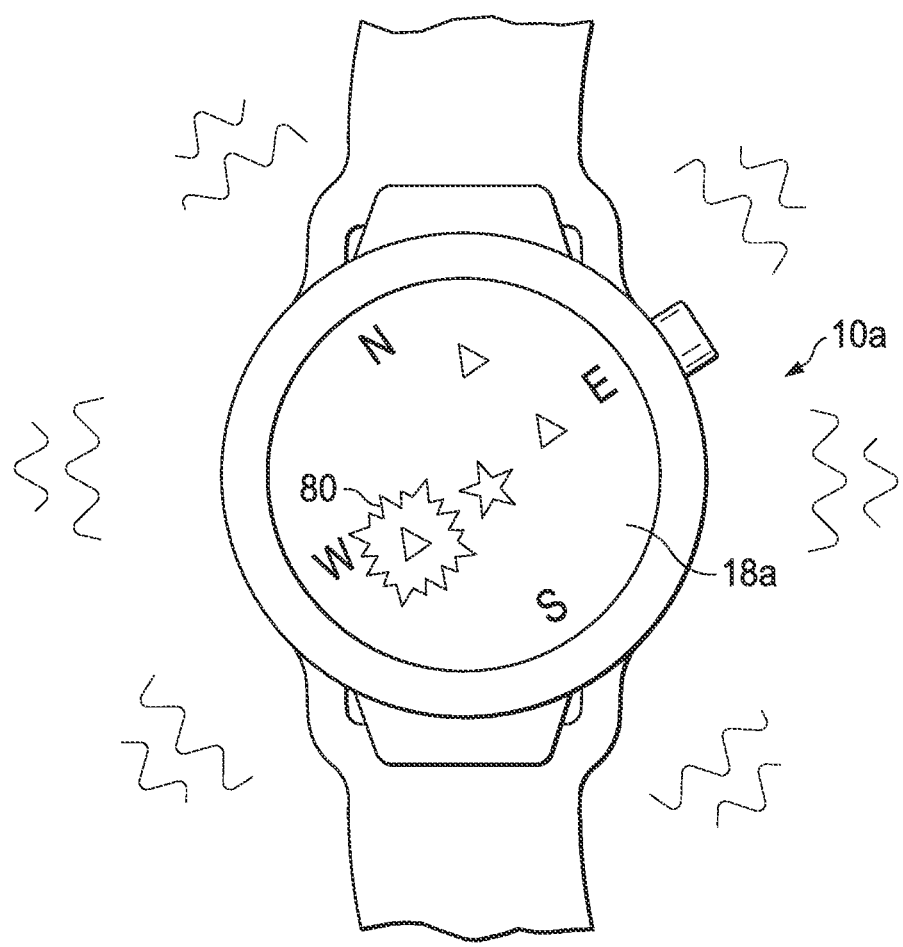
FIG. 6C is a simplified partial top view illustrating an embodiment of a wearable electronic device, in accordance with one embodiment of the present disclosure.

Turning to FIG. 6C, FIG. 6C is a simplified orthographic partial view of wearable electronic device 10a in accordance with an embodiment of the present disclosure. In one or more embodiments, wearable electronic device 10a may provide a notification 80 on a map, which may be displayed on display 18*a* for emergency messages received from users of like wearable electronic devices. As shown in FIG. 6C, notification 80 has highlighted a corresponding user, from which, for purposes of the present example such an emergency message has been received. As noted above, GPS location information may be included in such messages in certain embodiments. In one or more embodiments, wearable electronic device 10*a* may process this information to display notification 80, which may help users of other like wearable electronic devices identify the user. In one or more embodiments, wearable electronic device may also generate), haptic effects, audible alerts, combinations thereof or the like for received emergency notifications. In one or more embodiments, device control logic in wearable electronic device 10*a* may also display proximity information for a distance between the user wearing wearable electronic device and the user from which the emergency message was received. In one or more embodiments, device control logic may automatically display the mapping GUI upon receiving an emergency message from one or more other users or may be navigated to by a user.

Turning to FIG. 7, FIG. 7 is a simplified orthographic view of a wearable electronic device 10*b* in accordance with an embodiment of the present disclosure. Wearable electronic device 10*b* can include a strap portion 12*b*, a display portion 14*b* and a latch portion 16*b*. Display portion 14*b* may include a display 18*b*, one or more input elements 34(1)-(5), which may be configured on various sides of display portion 14*b*, and a plurality of pressure sensors 30(1)-(5), which may be configured beneath display 18*b*.

Display portion 14*b* may include ruggedized features, such as a protective body 24*b* and a protective screen 26*b*, which may be integrated into the protective body 24*b*. Protective body 24*b* may surround and encapsulate display 18*b* and input elements 34(1)-(4) and 36. In one or more embodiments, protective body 24*b* and protective screen 26*b* may provide water proofing for up to 200 m, as well as other ruggedized features as discussed above for wearable electronic device 10*b*.

Wearable electronic device 10*b* may include features the same as wearable electronic device 10*a*, except that display portion 14*b* may occupy more than half of the overall length of strap portion 12*b*. Display 18*b* may be formed of a flexible display screen such as a flexible OLED display or any other flexible display screen system. Thus, display 18*b* may bend with strap portion 12*b* to fit around a user's wrist. The increased display size provided by wearable electronic device may provide a user with additional conveniences for using and interacting with features and applications provided by wearable electronic device 10*b* as well as further streamlining interactions with wearable electronic device 10*b* for communicating messages to and from other electronic devices (including other like wearable electronic devices).

Wearable electronic device 10*b* may provide a similar GUI as described above for wearable electronic device 10*a*, however the GUI for wearable electronic device 10*b* may be organized in a row (or multiple rows) along display 18*b* of wearable electronic device 10*b*. Wearable electronic device 10*b* may provide similar features for navigating the GUI using input elements 34(1)-(4) and 36 and pressure sensors 30(1)-(5). Thus, as illustrated in FIG. 7, wearable electronic devices having features as those described for wearable electronic device 10*a* can be configured for any form factor of wearable electronic device, and, thus are clearly within the scope of alternative embodiments of the present disclosure.

Figure 8:
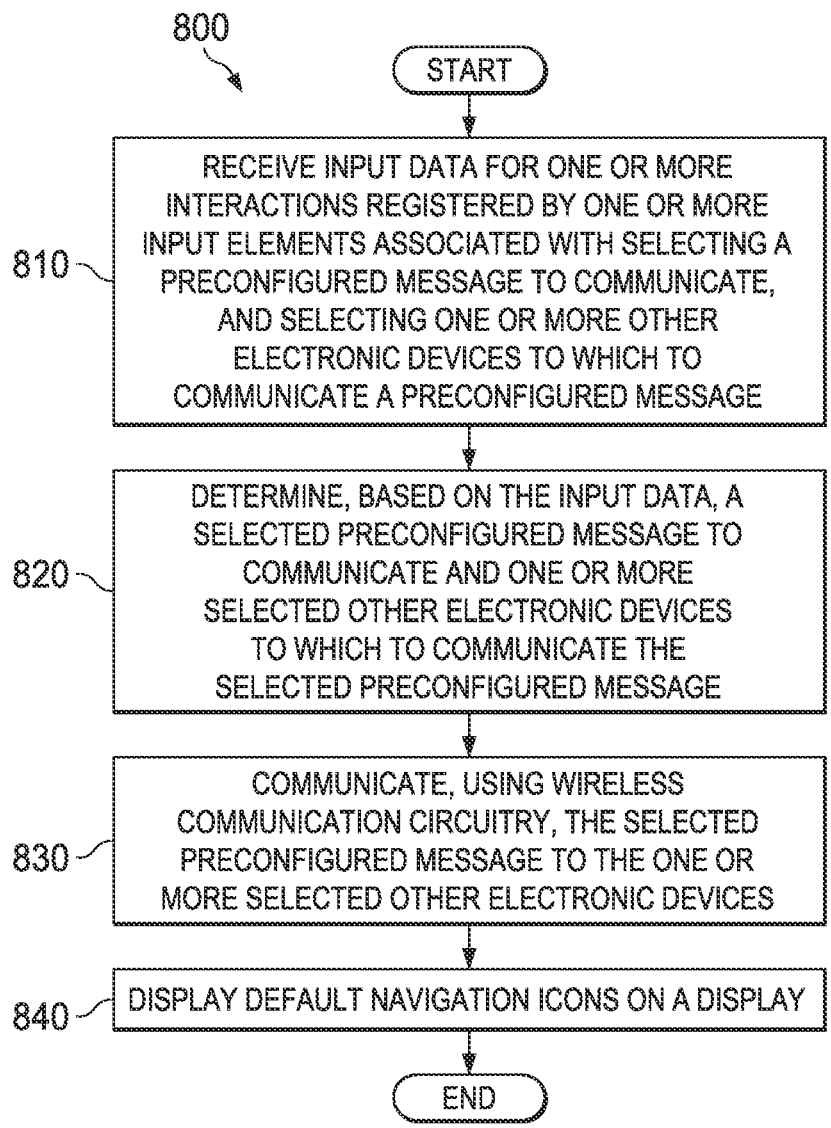
FIG. 8 is a simplified flow diagram illustrating potential operations associated with one embodiment of the present disclosure.

Turning to FIG. 8, FIG. 8 is a simplified flow diagram 800 illustrating potential operations for a wearable electronic device system in accordance with one embodiment of the present disclosure. The operations may be used to communicate a preconfigured message to another wearable electronic device. At 810, the system may receive input data for one or more interactions registered by one or more input elements associated with selecting a preconfigured message to communicate to one or more other electronic devices, and selecting one or more other electronic devices to which to communicate a preconfigured message. At 820, the system may determine, based on the input data, a selected preconfigured message to communicate and one or more selected other electronic devices to which to communicate the selected preconfigured message. At 830, the system may communicate, using wireless communication circuitry, the selected preconfigured message to the one or more selected other electronic devices. At 840, the system may display a set of default navigation icons on a display following the communicating.

Figure 9:
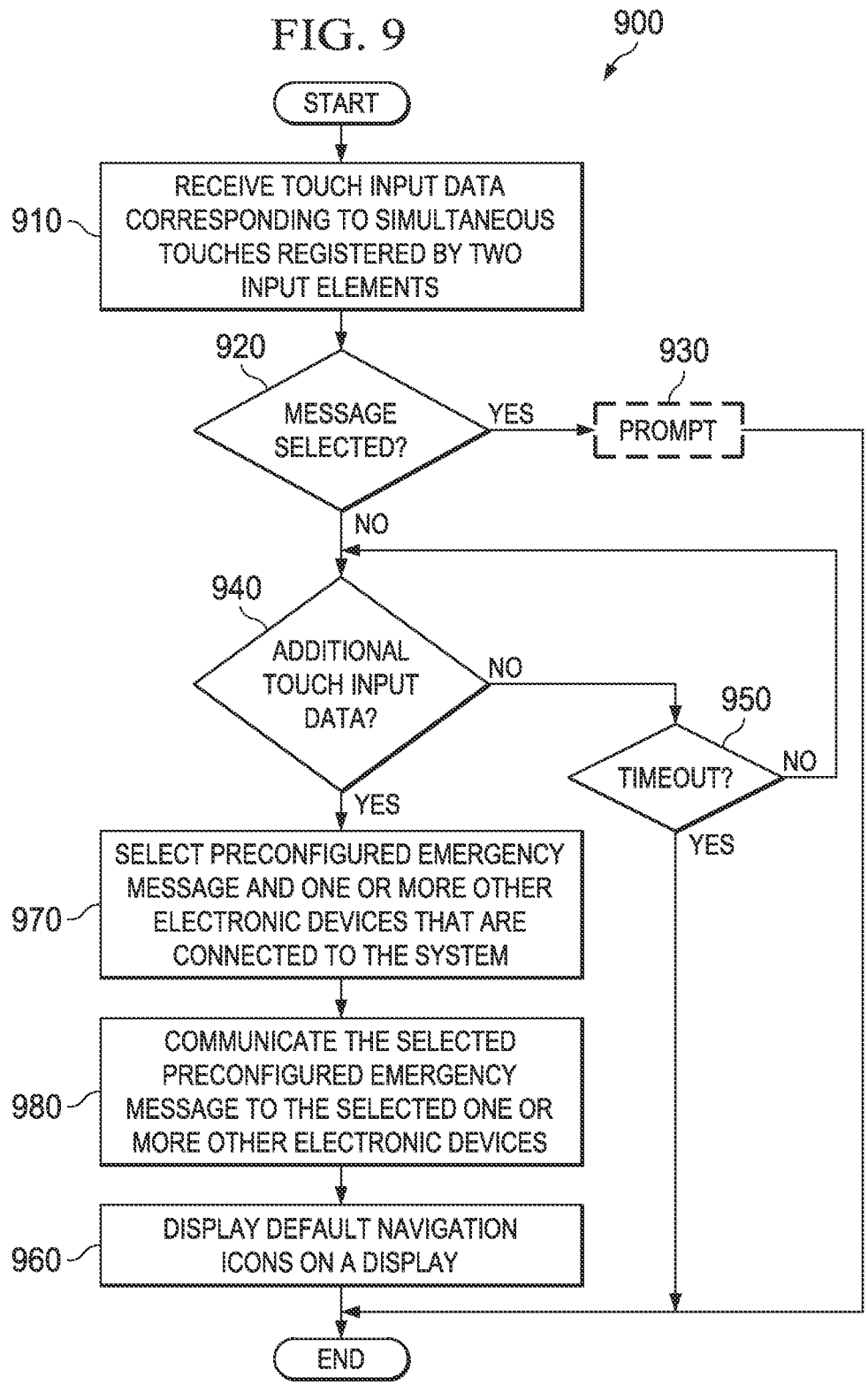
FIG. 9 is a simplified flow diagram illustrating potential operations associated with one embodiment of the present disclosure.

Turning to FIG. 9, FIG. 9 is a simplified block diagram illustrating potential operations for a wearable electronic device system in accordance with one embodiment of the present disclosure. The operations may be used to communicate a preconfigured emergency message to one or more other electronic devices that may be wirelessly connected to the wearable electronic device system. At 910, the system may receive touch input data corresponding to simultaneous touches registered by two input elements. At 920, the system may determine if a preconfigured message was previously selected before the simultaneous touch was registered by the two input elements. If so, operations may end. In an embodiment, the system may cause to be displayed a prompt on a display indicating that one or more users need to be selected at 930. (E.g., if an inadvertent simultaneous touch input was registered before one or more users were selected for receiving a previously selected preconfigured message.)

In no preconfigured message was previously selected, the system may determine if any additional touch input data has been received at 940 that may correspond to a confirmation for communicating a preconfigured emergency message. If no additional touch input data has been received, the system may check a timeout condition at 950 to determine if a predetermined timeout period has been exceeded. If not, the system may continue to cycle through the waiting for additional touch input data until the timeout period is exceeded or additional touch input is received (return to 940 and continue to check at 950).

If no additional touch input data is received and the timeout period is exceeded, the system may timeout and may display a set of default navigation icons for the system at 960. However, if additional touch input is detected that corresponds to a particular confirmation touch input element, the system may select the preconfigured emergency message and each of one or more other electronic devices that are connected to the system at 970. At 980, the system may communicate the selected preconfigured emergency message to the selected one or more other electronic devices using wireless communication circuitry in the system and may display the set of default navigation icons following the communicating at 960.

Figure 10:
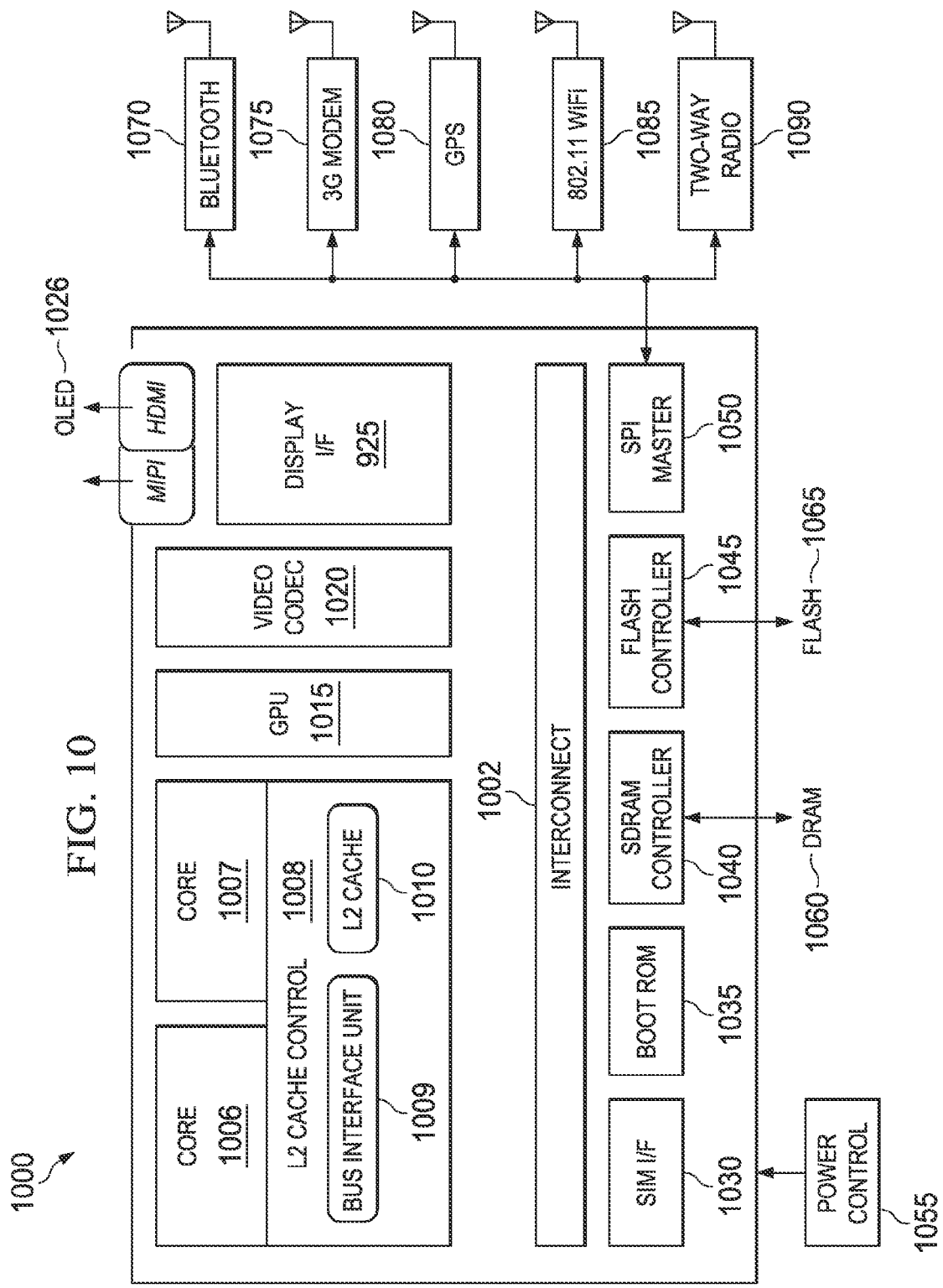
FIG. 10 is a simplified block diagram associated with an example ARM ecosystem on chip (SOC) of the present disclosure.

Turning to FIG. 10, FIG. 10 is a simplified block diagram associated with an example ARM ecosystem SOC 1000 of the present disclosure. At least one example implementation of the present disclosure can include the flexible display features discussed herein and an ARM component. For example, the example of FIG. 10 can be associated with any ARM core (e.g., A-9, A-15, etc.). Further, the architecture can be part of any type of wearable electronic device, tablet, smartphone (inclusive of Android™ phones, i-Phones™), i-Pad™, Google Nexus™, Microsoft Surface™, video processing components, any type of touch-enabled input element, etc.

In this example of FIG. 10, ARM ecosystem SOC 1000 may include multiple cores 1006-1007, an L2 cache control 1008, a bus interface unit 1009, an L2 cache 1010 and an interconnect 1002. In one or more embodiments, ARM ecosystem SOC 1000 may include a graphics processing unit (GPU) 1015, a video codec 1020, and a display I/F 1025, which may be associated with mobile industry processor interface (MIPI)/high-definition multimedia interface (HDMI) links that may couple to an OLED display 1026.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiments can include one or more communication capabilities, interfaces, and features such as instances of Bluetooth™ 1070, a 3G/4G modem 1075, a global positioning system (GPS) 1080, an 802.11 WiFi 1085 and a two-way radio 1090.

In operation, the example of FIG. 10 can offer processing capabilities, along with relatively low power consumption to enable computing of various types (e.g., mobile computing). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
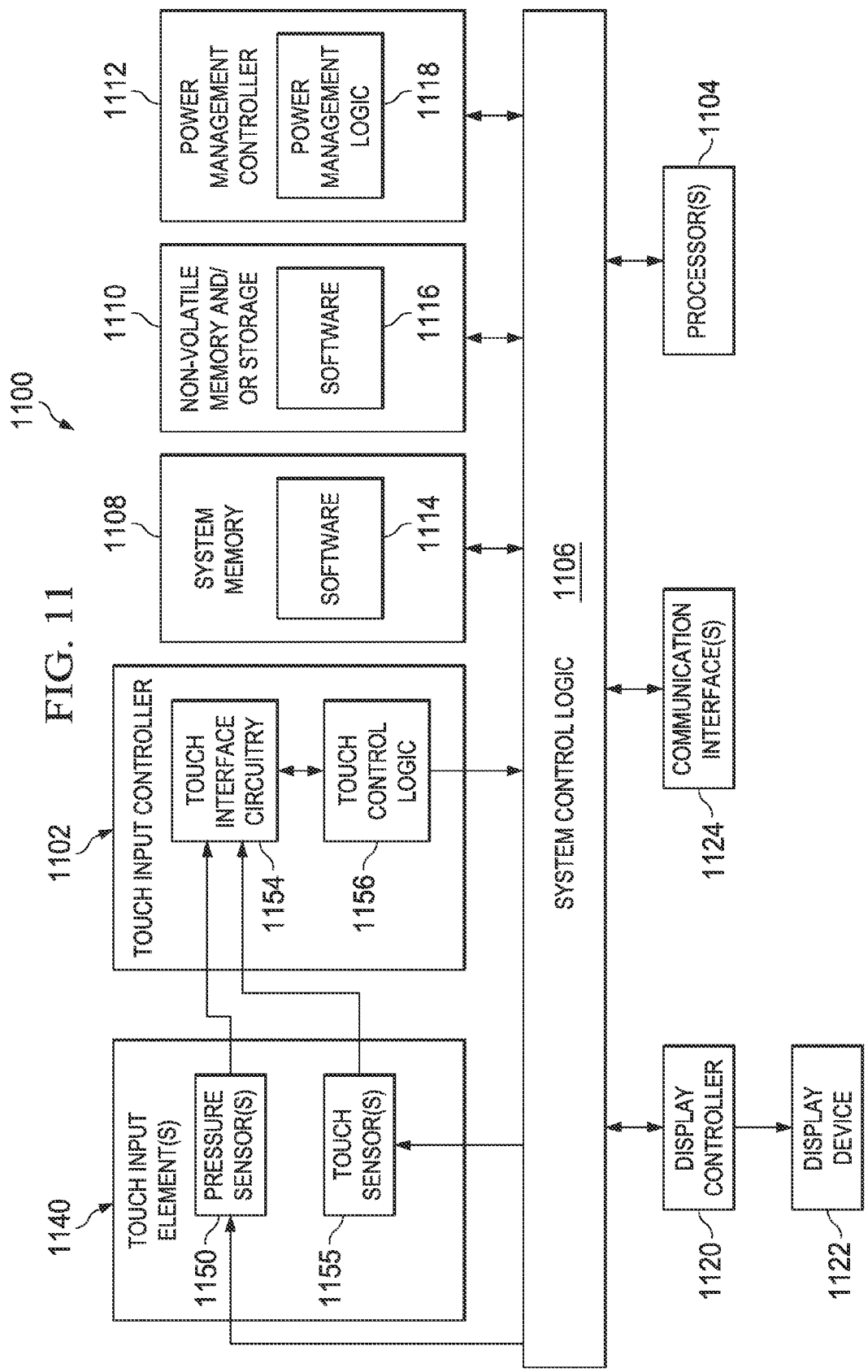
FIG. 11 is a simplified block diagram illustrating example logic that may be used to execute activities associated with the present disclosure.

Turning to FIG. 11, FIG. 11 is a simplified block diagram illustrating potential electronics and device control logic that may be associated with wearable electronic device 10a and 10b discussed herein. In at least one example embodiment, device control logic for wearable electronic device 10a and 10b may be included with, encompass and/or overlap with various logic described for system 1100. In at least one example embodiment, system 1100 can include an touch input controller 1102, one or more processors 1104, system control logic 1106 coupled to at least one of processor(s) 1104, system memory 1108 coupled to system control logic 1106, non-volatile memory and/or storage device(s) 1110 coupled to system control logic 1106, display controller 1120 coupled to system control logic 1106, display controller 1120 coupled to display device 1122, power management controller 1112 coupled to system control logic 1106 and/or communication interfaces 1124 coupled to system control logic 1106.

Hence, the basic building blocks of any wearable electronic device system or electronic device system (e.g., processor, controller, memory, I/O, display, etc.) can be used in conjunction with the teachings of the present disclosure. Certain components could be discrete or integrated into a System on Chip (SoC). Some general system implementations can include certain types of form factors in which system 1100 is part of a more generalized form factor. In alternate implementations, instead of wearable electronic devices, certain alternate embodiments deal with mobile phones, tablet devices, etc.

System control logic 1106, in at least one embodiment, can include any suitable interface controllers to provide for any suitable interface to at least one processor 1104 and/or to any suitable device or component in communication with system control logic 1106. System control logic 1106, in at least one embodiment, can include one or more memory controllers to provide an interface to system memory 1108. System memory 1108 may be used to load and store data and/or instructions, for example, for system 1100. System memory 1108, in at least one embodiment, can include any suitable volatile memory, such as suitable dynamic random access memory (DRAM) for example. System memory 1108 may store suitable software 1114 and/or non-volatile memory and/or storage device(s). System control logic 1106, in at least one embodiment, can include one or more I/O controllers to provide an interface to input controller 1102, display device 1122, power management controller 1112, and non-volatile memory and/or storage device(s) 1110.

Non-volatile memory and/or storage device(s) 1110 may be used to store data and/or instructions, for example within software 1116. Non-volatile memory and/or storage device(s) 1110 may include any suitable non-volatile memory, such as flash memory for example, and/or may include any suitable non-volatile storage device(s), such as one or more hard disc drives (HDDs), solid state drives (SSDs), etc. for example.

Power management controller 1112 may include power management logic 1118 configured to control various power management and/or power saving functions. In at least one example embodiment, power management controller 1112 is configured to reduce the power consumption of components or devices of system 1100 that may either be operated at reduced power or turned off when the wearable electronic device is in an inactive state (e.g., not being accessed, etc.). For example, in at least one embodiment, when the wearable electronic device is in an inactive state, power management controller 1112 may perform one or more of the following: power down the unused portion of input element(s) 1140; allow one or more of processor(s) 1104 to go to a lower power state if less computing power is required during times of inactivity; and shutdown any devices and/or components that may be unused when a wearable electronic device is in an inactive state. System control logic 1106, in at least one embodiment, can include one or more I/O controllers to provide an interface to any suitable input/output device(s), for example, an audio device to help convert sound into corresponding digital signals and/or to help convert digital signals into corresponding sound, a camera and/or a video recorder.

For at least one embodiment, at least one processor 1104 may be packaged together with logic for one or more controllers of system control logic 1106. In at least one embodiment, at least one processor 1104 may be packaged together with logic for one or more controllers of system control logic 1106 to form a System in Package (SiP). In at least one embodiment, at least one processor 1104 may be integrated on the same die with logic for one or more controllers of system control logic 1106. For at least one embodiment, at least one processor 1104 may be integrated on the same die with logic for one or more controllers of system control logic 1106 to form a System on Chip (SoC).

For touch control, touch input controller 1102 may include touch interface circuitry 1154 and touch control logic 1156. Touch interface circuitry 1154 may be coupled to one or more touch sensor(s) 1155 to detect touch input(s) to one or more touch input elements 1140. Touch interface circuitry 1154 may further be coupled to one or more pressure sensor(s) 1150 which may be configured beneath a display device (e.g., display device 1122) to detect touch inputs to the display device. Touch sensor interface circuitry 1154 may include any suitable circuitry that may depend, for example, at least in part on the touch-sensitive technology used for touch sensor(s) 11550 and pressure sensor(s) 1150. For example, a pair of contacts may be used for touch sensors or capacitive pressure sensing technology may be used, which may include a pair of capacitive layers. Touch interface circuitry 1154, in at least one embodiment, can include any suitable circuitry to convert analog signals registered for a touch input made to touch input element(s) 1140 (e.g., analog signals received from a first capacitive layer and a second capacitive layer or from a pair of contacts) into any suitable digital touch input data.

Touch control logic 1156 may be coupled to touch interface circuitry 1154 to help control touch interface circuitry 1154, in any suitable manner, to detect touch inputs (e.g., interactions) made to touch input element(s) 1140, (e.g., touch sensor(s) 1155 or pressure sensor(s) 1150). Touch control logic 1156 for at least one example embodiment may also be coupled to system control logic 1106 to output in any suitable manner digital touch input data corresponding to touch inputs detected by touch interface circuitry 1154. Suitable digital touch input data for at least one embodiment may include, for example, identification of which touch input element(s) 1140 (e.g., touch sensor(s) 1155 or pressure sensor(s) 1150) may have registered a touch input. In one or more embodiments, digital touch input data can include touch time information, which may additionally indicate the length of time a touch input may have been registered. Touch control logic 1156 may be implemented using any suitable logic, including any suitable hardware, firmware, and/or software logic (e.g., non-transitory tangible media), that may depend, for example, at least in part on the circuitry used for touch sensor interface circuitry 1154.

Touch control logic 1156 may be coupled to system control logic 1106 to output digital touch input data or other electronic sensor signals to system control logic 1106 and/or at least one processor 1104 for processing. For example, the touch input data may be processed to display additional information, including icons, preconfigured messages, users, etc. on display device 1122 or to communicate selected preconfigured messages to one or more selected users. At least one processor 1104 for at least one embodiment may execute any suitable software to process electronic sensor signal data output from touch control logic 1156. Suitable software may include, for example, any suitable driver software and/or any suitable application software.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., width, length, thickness, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include: a strap portion; and a display portion that may include: a display; one or more input elements configured to receive one or more interactions that may be associated with: selecting a preconfigured message to communicate and selecting one or more other electronic devices to which to communicate a preconfigured message; and wireless communication circuitry configured to communicate a selected preconfigured message to one or more selected other electronic devices.

Note, that in at least one embodiment one or more preconfigured messages can be configured by a user and stored in a memory in the wearable electronic device. Note also, that in at least one embodiment, a plurality of pressure sensors may be configured beneath the display to register one or more touch inputs made to the display. Note, additionally, that each of the plurality of pressure sensors may be arranged at a location beneath the display that corresponds to a layout of icons of a graphical user interface provided by the wearable electronic device. Note additionally, that in at least one embodiment, the wearable electronic device can further include a protective body with a protective screen that encapsulates the display portion and each of the one or more input elements, which, in one or more embodiments may provide water proofing for the display portion of the wearable electronic device and electronic components within the display portion.

In another example implementation, the wearable electronic device may include logic, at least a portion of which is partially implemented in hardware, the logic configured to: receive touch input data for one or more interactions registered by one or more input elements, wherein the touch input data may be associated: selecting a preconfigured message to communicate and selecting one or more other electronic devices to which to communicate a preconfigured message; determine, based on the touch input data, a selected preconfigured message and one or more selected other electronic devices to which to communicate the selected preconfigured message; communicate, using wireless communication circuitry, the selected preconfigured message to the one or more selected other electronic devices upon receiving touch input data corresponding to a simultaneous interaction with a pair of input elements; and display a default set of navigation icons on a display following the communication. Note, that in at least one embodiment, the logic may include at least one processor and at least one memory.

OTHER NOTES AND EXAMPLES

The following examples pertain to embodiments in accordance with this Specification. Note that all optional features of the apparatuses and systems described above may also be implemented with respect to the methods or processes described herein and specifics in the examples may be used anywhere in one or more embodiments.

Example 1 is a wearable electronic device, comprising: a strap portion; and a display portion that comprises: a display; one or more input elements configured to receive one or more interactions associated with: selecting a preconfigured message to communicate and selecting one or more other electronic devices to which to communicate a preconfigured message; and wireless communication circuitry configured to communicate a selected preconfigured message to one or more selected other electronic devices.

In Example 2, the subject matter of Example 1 can optionally include one or more preconfigured messages that can be configured by a user and stored in a memory in the wearable electronic device.

In Example 3, the subject matter of any one of Examples 1-2 can optionally include the one or more other electronic devices being one or more other wearable electronic devices having a same operational configuration as the wearable electronic device.

In Example 4, the subject matter of any one of Examples 1-3 can optionally include logic configured to discover, using the wireless communication circuitry, each of the one or more other wearable electronic devices based, at least in part, on a device-type identifier (ID) of each of the other wearable electronic devices.

In Example 5, the subject matter of any one of Examples 1-4 can optionally include a plurality of pressure sensors configured beneath the display to register one or more touch inputs made to the display.

In Example 6, the subject matter of Example 5 can optionally include each of the plurality of pressure sensors being arranged at a location beneath the display that corresponds to a layout of icons of a graphical user interface provided by the wearable electronic device.

In Example 7, the subject matter of any one of Examples 1-6 can optionally include a protective body with a protective screen that encapsulates the display portion and each of the one or more input elements.

In Example 8, the subject matter of any Example 7 can optionally include wherein the protective body and the protective screen being configured to provide water proofing for the display portion of the wearable electronic device and electronic components within the display portion.

In Example 9, the subject matter of any one of Examples 1-8 can optionally include the display being flexible to bend with the strap portion.

In Example 10, the subject matter of any one of Examples 1-9 can optionally include the display portion being flexible to bend with the strap portion.

In Example 11, the subject matter of any one of Examples 1-10 can optionally include a speaker; and one or more haptic elements.

In Example 12, the subject matter of Example 11 can optionally include logic configured to cause an alert to be generated upon receiving a message, using the wireless communication circuitry, wherein the alert is at least one of: an icon displayed on the display; a haptic effect generated using the one or more haptic elements; and an audible sound generated using the speaker.

Example 13 is wearable electronic device, comprising: logic, at least a portion of which is partially implemented in hardware, the logic configured to: receive touch input data for one or more interactions registered by one or more input elements, wherein the touch input data is associated with at least one of: selecting a preconfigured message to communicate and selecting one or more other electronic devices to which to communicate a preconfigured message; determine, based on the touch input data, a selected preconfigured message to communicate and one or more selected other electronic devices to which to communicate the selected preconfigured message; communicate, using wireless communication circuitry, the selected preconfigured message to the one or more selected other electronic devices upon receiving touch input data corresponding to a simultaneous interaction with a pair of input elements; and display a set of default navigation icons on a display following the communication.

In Example 14, the subject matter of Example 13 can optionally include the logic further comprising at least one processor; and at least one memory element.

In Example 15, the subject matter of Example 14 can optionally include the selected preconfigured message having been previously configured and stored with additional preconfigured messages in the at least one memory element.

In Example 16, the subject matter of any one of Examples 13-15 can optionally include the one or more other electronic devices being one or more other wearable electronic devices having a same operational configuration as the wearable electronic device and wherein the logic is further configured to: discover, using the wireless communication circuitry, each of the one or more other wearable electronic devices based, at least in part, on a device-type identifier (ID) of the other wearable electronic devices.

In Example 17, the subject matter of any one of Examples 13-16 can optionally include the logic being further configured to communicate a preconfigured emergency message to the one or more other electronic devices upon receiving touch input data corresponding to a simultaneous interaction with a first pair of input elements and receiving touch input data corresponding to another interaction with another input element different than the first pair of input elements; and display the set of default navigation icons on the display after the communication is completed.

In Example 18, the subject matter of any one of Examples 13-17 can optionally include the logic being further configured to: receive a message from another electronic device; and display the message on the display.

In Example 19, the subject matter of any one of Examples 13-18 can optionally include the logic being further configured to cause to be generated, upon receiving a message, an alert that is at least one of: an icon to be generated on the display; a haptic effect to be generating using one or more haptic elements; and an audible sound to be generated using a speaker.

Example 20 is at least one computer readable storage medium comprising instructions that, when executed, cause an apparatus to: receive touch input data for one or more interactions registered by one or more input elements, wherein the touch input data is associated with at least one of: selecting a preconfigured message to communicate and selecting one or more other electronic devices to which to communicate a preconfigured message; determine, based on the touch input data, a selected preconfigured message to communicate and one or more selected other electronic devices to which to communicate the selected preconfigured message; communicate, using wireless communication circuitry, the selected preconfigured message to the one or more selected other electronic devices upon receiving touch input data corresponding to a simultaneous interaction with a pair of input elements; and display a default set of navigation icons on a display following the communication.

In Example 21, the subject matter of Example 20 can optionally include the selected preconfigured message having been previously configured and stored with additional preconfigured messages in at least one memory element.

In Example 22, the subject matter of any one of Examples 20-21 can optionally include the one or more other electronic devices being one or more other wearable electronic devices having a same operational configuration as the wearable electronic device and wherein the medium further comprises instructions that, when executed, cause an apparatus to: discover, using the wireless communication circuitry, each of the one or more other wearable electronic devices based, at least in part, on a device-type identifier (ID) of the other wearable electronic devices.

In Example 23, the subject matter of any one of Examples 20-22 can optionally include instructions that, when executed, cause the apparatus to: receive a message from another electronic device: and display the message on the display.

In Example 24, the subject matter of any one of Examples 20-23 can optionally include instructions that, when executed, cause the apparatus to cause at least one of: generating an icon on the display; generating a haptic effect using one or more haptic elements; and generating an audible sound using a speaker.

In Example 25, the subject matter of any one of Examples 20-24 can optionally include instructions that, when executed, cause the apparatus to: communicate a preconfigured emergency message to the one or more other electronic devices upon receiving touch input data corresponding to a simultaneous interaction with a first pair of input elements and receiving touch input data corresponding to another interaction with another input element different than the first pair of input elements; and display the default set of navigation icons on the display after the communication is completed.

Example 26 is a method comprising: receiving touch input data for one or more interactions registered by one or more input elements, wherein the interactions are associated with at least one of: selecting a preconfigured message to communicate and selecting one or more other electronic devices to which to communicate a preconfigured message; determining, based on the touch input data, a selected preconfigured message to communicate and one or more selected other electronic devices to which to communicate the selected preconfigured message; and communicating, using wireless communication circuitry, the selected preconfigured message to the one or more selected other electronic devices upon receiving touch input data corresponding to a simultaneous interaction with a pair of input elements; and displaying a default set of navigation icons on a display following the communicating.

In Example 27, the subject matter of Example 26 can optionally include the selected preconfigured message having been previously configured and stored with additional preconfigured messages in at least one memory element.

In Example 28, the subject matter of any one of Examples 26-27 can optionally include the one or more other electronic devices being one or more other wearable electronic devices having a same operational configuration as the wearable electronic device and wherein the subject matter can further comprise: discovering, using the wireless communication circuitry, each of the one or more other wearable electronic devices based, at least in part, on a device-type identifier (ID) of the other wearable electronic devices.

In Example 29, the subject matter of any one of Examples 26-28 can optionally include receiving a message from another electronic device: and displaying the message on the display.

In Example 30, the subject matter of any one of Examples 26-29 can optionally include generating an alert upon receiving a message, wherein generating the alert includes at least one of: generating an icon on a display; generating a haptic effect using one or more haptic elements; and generating an audible sound using a speaker.

In Example 31, the subject matter of any one of Examples 26-30 can optionally include communicating a preconfigured emergency message to the one or more other electronic devices upon receiving touch input data corresponding to a simultaneous interaction with a first pair of input elements and receiving touch input data corresponding to another interaction with another input element different than the first pair of input elements; and displaying the default set of navigation icons on the display following the communicating.

Example 32 is an apparatus comprising means for performing the method of any one of Examples 26-31.

In Example 33, the subject matter of Example 32 can optionally include the means for performing the method comprising at least one processor and at least one memory element.

In Example 34, the subject matter of Example 33 can optionally include the at least one memory element comprising machine readable instructions, that when executed, cause the apparatus to perform the method of any one of Examples 26-31.

In Example 35, the subject matter of any one of Examples 32-34 can optionally include the apparatus being a computing system.

Example 36 is at least one computer readable medium comprising instructions that, when executed implement a method or realize an apparatus as recited in any one of Examples 1-19 or 26-31.

Example 37 is a wearable electronic device, comprising: means for receiving touch input data for one or more interactions registered by one or more input elements, wherein the interactions are associated with at least one of: selecting a preconfigured message to communicate and selecting one or more other electronic devices to which to communicate a preconfigured message; means for determining, based on the touch input data, a selected preconfigured message to communicate and one or more selected other electronic devices to which to communicate the selected preconfigured message; and means for communicating, using wireless communication circuitry, the selected preconfigured message to the one or more selected other electronic devices upon receiving touch input data corresponding to a simultaneous interaction with a pair of input elements; and means for displaying a default set of navigation icons on a display following the communicating.

In Example 38, the subject matter of Example 37 can optionally include the one or more other electronic devices are one or more other wearable electronic devices having a same operational configuration as the wearable electronic device and further comprising: means for discovering, using the wireless communication circuitry, each of the one or more other wearable electronic devices based, at least in part, on a device-type identifier (ID) of the other wearable electronic devices.

In Example 39, the subject matter of any one of Examples 37-38 can optionally include means for receiving a message from another electronic device: and means for displaying the message on the display.

In Example 40, the subject matter of any one of Examples 37-39 can optionally include means for generating an alert upon receiving a message, wherein generating the alert includes at least one of: means for generating an icon on a display; means for generating a haptic effect using one or more haptic elements; and means generating an audible sound using a speaker.

In Example 41, the subject matter of any one of Examples 37-40 can optionally include means for communicating a preconfigured emergency message to the one or more other electronic devices upon receiving touch input data corresponding to a simultaneous interaction with a first pair of input elements and receiving touch input data corresponding to another interaction with another input element different than the first pair of input elements; and means for displaying the default set of navigation icons on the display following the communicating.

What is claimed is:

1. A wearable electronic device, comprising:
    a strap portion; and
    a display portion that comprises:
        a display;
        one or more input elements configured to register one or more interactions associated with: selecting a preconfigured message to communicate and selecting one or more other electronic devices to which to communicate a preconfigured message;
        logic, at least a portion of which is partially implemented in hardware, the logic configured to receive touch input data for the one or more interactions registered by the one or more input elements and determine, based on the touch input data, a selected preconfigured message to communicate and one or more selected other electronic devices to which to communicate the selected preconfigured message;
        wireless communication circuitry configured to communicate a selected preconfigured message to one or more selected other electronic devices upon receiving touch input data corresponding to a simultaneous interaction with a pair of input elements; and
        the logic further configured to display a default set of navigation icons on a display following the communication.

2. The wearable electronic device of claim 1, wherein one or more preconfigured messages can be configured by a user and stored in a memory in the wearable electronic device.

3. The wearable electronic device of claim 1, wherein the one or more other electronic devices are one or more other wearable electronic devices having a same operational configuration as the wearable electronic device.

4. The wearable electronic device of claim 3, further comprising:
    logic configured to discover, using the wireless communication circuitry, each of the one or more other wearable electronic devices based, at least in part, on a device-type identifier (ID) of each of the other wearable electronic devices.

5. The wearable electronic device of claim 1, further comprising:
    a plurality of pressure sensors configured beneath the display to register one or more touch inputs made to the display.

6. The wearable electronic device of claim 5, wherein each of the plurality of pressure sensors are arranged at a location beneath the display that corresponds to a layout of icons of a graphical user interface provided by the wearable electronic device.

7. The wearable electronic device of claim 1, further comprising:
    a protective body with a protective screen that encapsulates the display portion and each of the one or more input elements.

8. The wearable electronic device of claim 7, wherein the protective body and protective screen are configured to provide water proofing for the display portion of the wearable electronic device and electronic components within the display portion.

9. The wearable electronic device of claim 1, wherein the display is flexible to bend with the strap portion.

10. The wearable electronic device of claim 1, wherein the display portion is flexible to bend with the strap portion.

11. The wearable electronic device of claim 1, further comprising:
    a speaker; and
    one or more haptic elements.

12. The wearable electronic device of claim 11, further comprising:
    logic configured to cause an alert to be generated upon receiving a message, using the wireless communication circuitry, wherein the alert is at least one of:
    an icon displayed on the display;
    a haptic effect generated using the one or more haptic elements; and
    an audible sound generated using the speaker.

13. A wearable electronic device, comprising:
    logic, at least a portion of which is partially implemented in hardware, the logic configured to:
    receive touch input data for one or more interactions registered by one or more input elements, wherein the touch input data is associated with at least one of: selecting a preconfigured message to communicate and selecting one or more other electronic devices to which to communicate a preconfigured message;
    determine, based on the touch input data, a selected preconfigured message to communicate and one or more selected other electronic devices to which to communicate the selected preconfigured message;
    communicate, using wireless communication circuitry, the selected preconfigured message to the one or more selected other electronic devices upon receiving touch input data corresponding to a simultaneous interaction with a pair of input elements; and display a default set of navigation icons on a display following the communication.

14. The wearable electronic device of claim 13, wherein the logic further comprises:
   at least one processor; and
   at least one memory element.

15. The wearable electronic device of claim 14, wherein the selected preconfigured message has been previously configured and stored with additional preconfigured messages in the at least one memory element.

16. The wearable electronic device of claim 13, wherein the one or more other electronic devices are one or more other wearable electronic devices having a same operational configuration as the wearable electronic device and wherein the logic is further configured to:
   discover, using the wireless communication circuitry, each of the one or more other wearable electronic devices based, at least in part, on a device-type identifier (ID) of the other wearable electronic devices.

17. The wearable electronic device of claim 13, wherein the logic is further configured to:
   communicate a preconfigured emergency message to the one or more other electronic devices upon receiving touch input data corresponding to a simultaneous interaction with a first pair of input elements and receiving touch input data corresponding to another interaction with another input element different than the first pair of input elements.

18. The wearable electronic device of claim 13, wherein the logic is further configured to cause to be generated, upon receiving a message, an alert that is at least one of:
   an icon to be generated on the display;
   a haptic effect to be generating using one or more haptic elements; and
   an audible sound to be generated using a speaker.

19. At least one non-transitory computer readable storage medium comprising instructions that, when executed, cause a wearable electronic device to:
   receive touch input data for one or more interactions registered by one or more input elements, wherein the touch input data is associated with at least one of: selecting a preconfigured message to communicate and selecting one or more other electronic devices to which to communicate a preconfigured message;
   determine, based on the touch input data, a selected preconfigured message to communicate and one or more selected other electronic devices to which to communicate the selected preconfigured message;
   communicate, using wireless communication circuitry, the selected preconfigured message to the one or more selected other electronic devices upon receiving touch input data corresponding to a simultaneous interaction with a pair of input elements; and
   display a default set of navigation icons on a display following the communication.

20. The medium of claim 19, further comprising instructions that, when executed, cause the apparatus to:
   generate an alert related to a message being received using the wireless communication circuitry.

21. The medium of claim 19, further comprising instruction that, when executed, cause the apparatus to:
   communicate a preconfigured emergency message to the one or more other electronic devices upon receiving touch input data corresponding to a simultaneous interaction with a first pair of input elements and receiving touch input data corresponding to another interaction with another input element different than the first pair of input elements; and
   display the default set of navigation icons on the display after the communication is completed.

22. A method for a wearable electronic device, comprising:
   receiving touch input data for one or more interactions registered by one or more input elements, wherein the interactions are associated with at least one of: selecting a preconfigured message to communicate and selecting one or more other electronic devices to which to communicate a preconfigured message;
   determining, based on the touch input data, a selected preconfigured message to communicate and one or more selected other electronic devices to which to communicate the selected preconfigured message;
   communicating, using wireless communication circuitry, the selected preconfigured message to the one or more selected other electronic devices upon receiving touch input data corresponding to a simultaneous interaction with a pair of input elements; and
   displaying a default set of navigation icons on a display following the communicating.

23. The method of claim 22, further comprising:
   generating an alert related to a message being received using the wireless communication circuitry, wherein the alert is at least one of:
   an icon generated on the display;
   a haptic effect generated using one or more haptic elements; and
   an audible sound generated using a speaker.

24. The method of claim 22, further comprising:
   receiving a message from another electronic device: and
   displaying the message on the display.

25. The method of claim 22, further comprising:
   communicating a preconfigured emergency message to the one or more other electronic devices upon receiving touch input data corresponding to a simultaneous interaction with a first pair of input elements and receiving touch input data corresponding to another interaction with another input element different than the first pair of input elements; and
   displaying the default set of navigation icons on the display following the communicating.

* * * * *

UNITED STATES PATENT AND TRADEMARK OFFICE
CERTIFICATE OF CORRECTION

| | | |
|---|---|---|
| PATENT NO. | : 9,317,155 B2 | Page 1 of 1 |
| APPLICATION NO. | : 14/142471 | |
| DATED | : April 19, 2016 | |
| INVENTOR(S) | : Aleksander Magi | |

It is certified that error appears in the above-identified patent and that said Letters Patent is hereby corrected as shown below:

Claims

In column 33, line 33, in claim 18, delete "generating" and insert -- generated --, therefor.

Signed and Sealed this
Twelfth Day of July, 2016

Michelle K. Lee
*Director of the United States Patent and Trademark Office*